(12) United States Patent
Olson et al.

(10) Patent No.: US 7,200,183 B2
(45) Date of Patent: Apr. 3, 2007

(54) CONSTRUCTION OF AN INTERFERENCE MATRIX FOR A CODED SIGNAL PROCESSING ENGINE

(75) Inventors: Eric S. Olson, Boulder, CO (US); John K. Thomas, Erie, CO (US)

(73) Assignee: Tensorcomm Inc., Westminster, CO (US)

( * ) Notice: Subject to any disclaimer, the term of this patent is extended or adjusted under 35 U.S.C. 154(b) by 910 days.

(21) Appl. No.: 10/294,834

(22) Filed: Nov. 15, 2002

(65) Prior Publication Data

US 2004/0052305 A1 Mar. 18, 2004

Related U.S. Application Data

(60) Provisional application No. 60/331,480, filed on Nov. 16, 2001.

(51) Int. Cl.
H04B 15/00 (2006.01)

(52) U.S. Cl. .................................................. 375/285

(58) Field of Classification Search ................ 375/285, 375/278, 346, 316, 216, 347, 229; 702/196; 705/520, 514; 455/63, 65; 370/342, 335, 370/320
See application file for complete search history.

(56) References Cited

U.S. PATENT DOCUMENTS

| | | | |
|---|---|---|---|
| 5,343,493 A | 8/1994 | Karimullah | |
| 5,644,592 A | 7/1997 | Divsalar et al. | |
| 5,787,130 A | 7/1998 | Kotzin et al. | |
| 5,812,086 A | 9/1998 | Bertiger et al. | |
| 5,844,521 A | 12/1998 | Stephens et al. | |
| 5,859,613 A | 1/1999 | Otto | |
| 5,872,540 A | 2/1999 | Casabona et al. | |
| 5,872,776 A | 2/1999 | Yang | |
| 5,926,761 A | 7/1999 | Reed et al. | |
| 5,930,229 A | 7/1999 | Yoshida et al. | |
| 5,953,369 A | 9/1999 | Suzuki | |
| 5,995,499 A | 11/1999 | Hottinen et al. | |

(Continued)

OTHER PUBLICATIONS

Behrens, R.T., L.L. Scharf, "Parameter Estimation in the Presence of Low-Rank Noise", Proceedings of the Twenty-second Asilomar Conference on Signals, Systems, and Computers, Pacific Grove, CA, Nov. 1988.

(Continued)

Primary Examiner—Khanh Tran
Assistant Examiner—Sam K. Ahn
(74) Attorney, Agent, or Firm—Anand P. Narayan; Steven J. Shattil

(57) ABSTRACT

A novel method for generating an interference matrix S is disclosed. The method comprises the following steps: A) Determining the number of active channels N in a transmitter; B) Selecting the transmitter to be canceled and assigning the transmitters sequentially to the variable t; C) Selecting the channel to be cancelled and assigning the channels sequentially to the variable n, where n is less than or equal to N; D) Determining if a multipath signal should be canceled and assigning the multipaths of interest to the respective variable M; E) Generating a sequence of column vectors V; F) Repeating steps B, C, D, E, F and G for each column vector of interest; and G) Defining the S matrix as $S=[V_1\ V_2\ \ldots\ V_c]$ wherein the index denotes the column index c. In addition, an apparatus for generating the interference matrix is also disclosed.

95 Claims, 9 Drawing Sheets

U.S. PATENT DOCUMENTS

| | | | |
|---|---|---|---|
| 6,002,727 | A | 12/1999 | Uesugi |
| 6,014,373 | A | 1/2000 | Schilling et al. |
| 6,088,383 | A | 7/2000 | Suzuki et al. |
| 6,101,385 | A | 8/2000 | Monte et al. |
| 6,104,712 | A | 8/2000 | Robert et al. |
| 6,115,409 | A | 9/2000 | Upadhyay et al. |
| 6,127,973 | A | 10/2000 | Choi et al. |
| 6,131,013 | A | 10/2000 | Bergstrom et al. |
| 6,137,788 | A | 10/2000 | Sawahashi et al. |
| 6,141,332 | A | 10/2000 | Lavean |
| 6,154,443 | A | 11/2000 | Huang et al. |
| 6,157,685 | A | 12/2000 | Tanaka et al. |
| 6,157,847 | A | 12/2000 | Buehrer et al. |
| 6,166,690 | A | 12/2000 | Lin et al. |
| 6,172,969 | B1 | 1/2001 | Kawakami et al. |
| 6,175,587 | B1 | 1/2001 | Madhow et al. |
| 6,192,067 | B1 | 2/2001 | Toda et al. |
| 6,201,799 | B1 | 3/2001 | Huang et al. |
| 6,215,812 | B1 | 4/2001 | Young et al. |
| 6,219,376 | B1 | 4/2001 | Zhodzishsky et al. |
| 6,222,828 | B1 | 4/2001 | Ohlson et al. |
| 6,230,180 | B1 | 5/2001 | Mohamed |
| 6,233,229 | B1 | 5/2001 | Ranta et al. |
| 6,233,459 | B1 | 5/2001 | Sullivan et al. |
| 6,240,124 | B1 | 5/2001 | Wiedeman et al. |
| 6,256,336 | B1 | 7/2001 | Rademacher et al. |
| 6,259,688 | B1 | 7/2001 | Schilling et al. |
| 6,278,726 | B1 | 8/2001 | Mesecher |
| 6,282,231 | B1 | 8/2001 | Norman et al. |
| 6,282,233 | B1 | 8/2001 | Yoshida |
| 6,285,316 | B1 | 9/2001 | Nir et al. |
| 6,285,319 | B1 | 9/2001 | Rose |
| 6,301,289 | B1 | 10/2001 | Bejjani et al. |
| 6,304,618 | B1 | 10/2001 | Hafeez et al. |
| 6,308,072 | B1 | 10/2001 | Labedz et al. |
| 6,317,453 | B1 | 11/2001 | Chang |
| 6,321,090 | B1 | 11/2001 | Soliman |
| 6,324,159 | B1 | 11/2001 | Mennekens et al. |
| 6,327,471 | B1 | 12/2001 | Song |
| 6,333,947 | B1 | 12/2001 | van Heeswyk et al. |
| 6,351,235 | B1 | 2/2002 | Stilp |
| 6,351,642 | B1 | 2/2002 | Corbett et al. |
| 6,359,874 | B1 | 3/2002 | Dent |
| 6,377,636 | B1 | 4/2002 | Paulraj et al. |
| 6,459,693 | B1 | 10/2002 | Park et al. |
| 2001/0003443 | A1 | 6/2001 | Velazquez et al. |
| 2001/0020912 | A1 | 9/2001 | Naruse et al. |
| 2001/0021646 | A1 | 9/2001 | Antonucci et al. |
| 2001/0046266 | A1 | 11/2001 | Rakib et al. |
| 2002/0001299 | A1 | 1/2002 | Petch et al. |
| 2003/0053524 | A1* | 3/2003 | Dent .......................... 375/148 |
| 2003/0092456 | A1* | 5/2003 | Dent .......................... 455/503 |

OTHER PUBLICATIONS

Best, Roland E., Phase Locked Loops: Design, Simulation, and Applications, 4th edition, McGraw Hill.

Cheng U., et. al., "Spread-Spectrum Code Acquisition in the Presence of Doppler shift and data modulation", IEEE Transactions on Communications vol. 38, No. 2, Feb. 1990.

Duel-Hallen, Alexandra, "Decorrelating decision-feedback multiuser detector for synchronous code-division multiple-access channel", IEEE Trans. Common., vol. 41, No. 2, pp. 285-290, Feb. 1993.

Garg, V.K. et al., "Wireless and Personal Communications Systems", Prentice-Hall, 1996.

Iltis, Ronald A., et. al., MultiUser Detection of Quasisynchronous CDMA signals using linear decorrelators, IEEE Transactions on Communications, vol. 44, No. 11, Nov. 1996.

Kaplan, Elliot D., Editor, Understanding GPS: Principles and Applications, Artech House.

Kohno, Ryuji and Mitsutoshi Hai, "Cancellation techniques of co-channel interference in asynchronous spread spectra multiple access systems", Electronics and Common. in Japan, vol. 66-A, No. 5, pp. 20-29, May 1983.

Lupas, Ruxandra and Sergio Verdu, "Linear multiuser detectors for synchronous code-division multiple-access channels", IEEE Trans. Info. Theory, vol. 35, No.1, pp. 123-136, Jan. 1989.

Lupas, Ruxandra and Sergio Verdu, "Near-far resistance of multiuser detectors in asynchronous channels", IEEE Trans. Common., vol. 38, No. 4, pp. 496-508, Apr. 1990.

Mitra U., et. al., "Adaptive Decorrelating Detectors for CDMA systems", Accepted for publication in the Wireless Personal Communications Journal, May 1995.

Mitra U., et. al., "Adaptive Receiver algorithms for Near-Far Resistant CDMA", To appear in IEEE Transaction on Communications, Apr. 1995.

Price, R. and Green, P. E., Jr. "A Communication Technique for Multipath Channels," _Proc IRE_ vol. 46, pp. 555-570, Mar. 1958.

Rapport, T.S., "Wireless Communications, Principles and Practice", Prentice-Hall, 1996.

Scharf L.L., B. Friedlander, Matched Subspace Detectors, IEEE Trans Signal Proc SP-42:8,pp. 2146-2157 (Aug. 1994).

Scharf, L.L., Statistical Signal Processing: Detection, Estimation, and Time Series Analysis, Addison-Wesley Publishing Co., 1991.

Schlegel, C. et al., "Coded Asynchronous CDMA and its Efficient Detection", IEEE Transactions on Information Theory, vol. 44, No. 7, Nov. 1998.

Schlegel, C. et. al., "Projection Receiver: A New Efficient Multi-User Detector", IEEE 1995.

Schlegel, C. Zengjun Xiang, "A new projection receiver for coded Synchronous Multi-User CDMA Systems".

Schneider, Kenneth S., "Optimum detection of code division multiplexed signals", IEEE Trans. Aerospace and Electronic Systems, vol. AES-15, No. 1, pp. 181-185, Jan. 1979.

Stimson, G.W., "An Introduction to Airborne Radar", SciTech Publishing Inc., 1998.

Verdu, Sergio, "Minimum probability of error for asynchronous Gaussian multiple-access channels", IEEE Trans. Info. Theory, vol. IT-32, No. 1, pp. 85-96, Jan. 1986.

Viterbi, A.J., "CDMA, Principles of Spread Spectrum Communication", Addison Wesley, 1995.

Viterbi, Andrew J., "Very low rate convolutional codes for maximum theoretical performance of spread-spectrum multiple-access channels", IEEE J. Select. Areas Common., vol. 8, No. 4, pp. 641-649, May 1990.

B. Widrow, S. Stearns, Adaptive Signal Processing, Prentice-Hall, Signal Processing Series, (1985).

Xie, Zhenhua, Robert T. Short and Craig K. Rushforth, "A family of suboptimum detectors for coherent multiuser communications", IEEE J. Select. Areas Common., vol. 8, No. 4, pp. 683-690, May 1990.

Zheng, Fu-Chun, et. al., "On the performance of Near-Far Resistant CDMA Detectors in the Presence of Synchronization Errors", IEEE Transactions on Communications, vol. 43, No. 12, Nov. 1995.

* cited by examiner

(PRIOR ART)

(PRIOR ART)

CONSTRUCTION OF AN INTERFERENCE MATRIX FOR A CODED SIGNAL PROCESSING ENGINE

CROSS-REFERENCE TO RELATED APPLICATIONS

This application makes reference to: U.S. Provisional Patent Application No. 60/422,476, entitled "Alternate Correlator Design for Coded Signal Processing Engine," filed Oct. 31, 2002; U.S. Provisional Patent Application No. 60/421,565, entitled "A Projection Based Receiver for WCDMA Systems," filed Oct. 28, 2002; U.S. Provisional Patent Application No. 60/418,181, entitled "Interference Suppression with Efficient Matrix Inversion in a DS-CDMA System," filed Oct. 15, 2002; U.S. Provisional Patent Application No. 60/418,188, entitled "Carrier Phase Recovery Circuit," filed Oct. 15, 2002; U.S. Provisional Patent Application No. 60/418,187, entitled "Method for Channel Amplitude Estimation and Interference Vector Construction," filed Oct. 15, 2002; U.S. Provisional Patent Application No. 60/412,550, entitled "A Controller for Interference Cancellation in Spread Spectrum Systems," filed Sep. 23, 2002; U.S. Provisional Patent Application No. 60/354,093, entitled "A Parallel CPSE Based Receiver for Communication Signal Processing," filed Feb. 5, 2002; U.S. patent application Ser. No. 10/247,836, entitled "Serial Cancellation Receiver Design for a Coded Signal Processing Engine," filed Sep. 20, 2002; U.S. Provisional Patent Application No. 60/348,106, entitled "Serial Receiver Design for a Coded Signal Processing Engine," filed Jan. 14, 2002; U.S. patent application Ser. No. 10/178,541, entitled "Method and Apparatus to Compute the Geolocation of a Communication Device Using Orthogonal Projection Methods," filed Jun. 25, 2002; U.S. Provisional Patent Application No. 60/333,143, entitled "Method and Apparatus to Compute the Geolocation of a Communication Device Using Orthogonal Projection Methods," filed Nov. 27, 2001; U.S. Provisional Patent Application No. 60/331,480, entitled "Construction of an Interference Matrix for a Coded Signal Processing Engine," filed Nov. 16, 2001; U.S. patent application Ser. No. 09/988,219, entitled "A Method and Apparatus for Implementing Projections in Signal Processing Applications," filed Nov. 19, 2001; U.S. Provisional Patent Application No. 60/325,215, entitled "An Apparatus for Implementing Projections in Signal Processing Applications," filed Sep. 28, 2001; U.S. patent application Ser. No. 09/988,218, entitled "Interference Cancellation in a Signal," filed Nov. 19, 2001; U.S. Provisional Patent Application No. 60/326,199, entitled "Coded Signal Processing Engine (CSPE) Architecture," filed Oct. 2, 2001; U.S. Pat. No. 6,380,879, entitled "Method and Apparatus for Acquiring Wide-Band Pseudorandom Noise Encoded Waveforms," issued on Apr. 30, 2002; U.S. Pat. No. 6,362,760, entitled "Method and Apparatus for Acquiring Wide-Band Pseudorandom Noise Encoded Waveforms," issued Mar. 26, 2002; U.S. Pat. No. 6,252,535, entitled "Method and Apparatus for Acquiring Wide-Band Pseudorandom Noise Encoded Waveforms," issued Jun. 26, 2001; U.S. Provisional Patent Application No. 60/251,432, entitled "Architecture for Acquiring, Tracking and Demodulating Pseudorandom Coded Signals in the Presence of Interference," filed Dec. 4, 2000; U.S. patent application Ser. No. 09/612,602, entitled "Rake Receiver for Spread Spectrum Signal Demodulation," filed Jul. 7, 2000, and issued as U.S. Pat. No. 6,430,216 on Aug. 6, 2002; and U.S. patent application Ser. No. 09/137,183, entitled "Method and Apparatus for Acquiring Wide-Band Pseudorandom Noise Encoded Waveforms," filed Aug. 20, 1998. The entire disclosure and contents of these applications are hereby incorporated by reference.

BACKGROUND OF THE INVENTION

1. Field of the Invention

The present invention relates generally to a method and apparatus for the cancellation of interference in the reception of wide-band, sequence encoded waveforms, and more particularly to a method and apparatus for the construction of interference matrices for a Coded Signal Processing Engine (CSPE) with the intent to cancel interference and improve reception, in terms of signal-to-noise (SNR) and bit error rate (BER). The CSPE may be used to improve the acquisition, tracking and demodulation of a sequence encoded (spread spectrum) signal in an interference-limited environment, where interference is defined as signals intended for other receivers. Such improvements may enhance capacity, coverage and data rates of spread spectrum systems, such as those that employ code-division multiple access (CDMA). Furthermore, such improvements may enhance the ability to determine the receiver's geographical location, namely a mobile unit in a cellular system (geo-location).

2. Description of the Prior Art

In spread spectrum systems, whether it is a wireless communication system, a Global Positioning System (GPS) or a radar system, each transmitter may be assigned a unique code and in many instances each transmission from a transmitter is assigned a unique code. The code is nothing more than a sequence (often pseudorandom) of bits. Examples of codes include Gold codes (used in GPS—see Kaplan, Elliot D., Editor, *Understanding GPS: Principles and Applications*, Artech House 1996), Barker codes (used in radar—see Stimson, G. W., "*An Introduction to Airborne Radar*", SciTech Publishing Inc., 1998) and Walsh codes (used in communications systems, such as cdmaOne—See IS-95). These spreading codes may be used to spread the signal across a specified range of frequencies in the electromagnetic spectrum.

Assigning a unique code to each transmitter allows the receiver to distinguish between different transmitters. An example of a spread spectrum system that uses unique codes to distinguish between transmitters is a GPS system.

In some instances, such as in a coded radar system, each pulse is assigned a unique code so that the receiver is able to distinguish between different pulses by the codes.

If a single transmitter has to broadcast different messages to different receivers, such as a base station in a wireless communication system broadcasting to multiple mobiles, one may use codes to distinguish between messages for each mobile. In this scenario, each symbol for a particular user is encoded using the code assigned to that user. By coding in this manner, the receiver, by knowing its own code, may decipher the message intended for it from the superposition of message signals received.

In some communication systems, a symbol is assigned to a sequence of bits that comprise a message. For example, a digital message may be grouped into sets of M bit sequences where each unique sequence is assigned a symbol. For example, if M=6, then each set of 6 bits may assume one of $2^6$=64 possibilities. Such a system would broadcast a waveform, called a symbol, which would represent a sequence of transmitted bits. For example, the symbol $\alpha$ might denote the sequence 101101 and the symbol $\beta$ might denote the sequence 110010. In a spread spectrum system, these symbols are referred to as codes. An example of such a communication system is the mobile to base station (forward/down) link of cdmaOne.

Of course, all of these techniques may be combined to distinguish between transmitters, messages, pulses and symbols in a single system. The key idea in all of these coded systems is that the receiver knows the code(s) of the message intended for it. By applying the code(s) correctly to the received signal, the receiver may extract the message for which it is intended. However, such receivers are more complex than receivers that distinguish between messages by time and/or frequency alone. Complexity arises because the signal received is a linear combination of all the coded signals present in the spectrum of interest at any given time. The receiver must be able to extract the message intended for it from this linear combination of coded signals.

The following section presents the problem of interference in linear algebraic terms and provides a method by which it may be cancelled.

Let H be a matrix containing the spread signal from source number 1 and let $\theta_1$ be the amplitude of the signal from this source. Let $s_i$ be the spread signals for the remaining sources and let $\phi_i$ be the corresponding amplitudes. Suppose that the receiver is interested in source number 1. The signals from the other sources may be considered to be interference. The received signal is:

$$y = H\theta_1 + s_2\phi_2 + s_3\phi_3 + \ldots + s_p\phi_p + n \quad (1)$$

where n is the additive noise term and p is the number of sources in the spread spectrum system. Let the length of the vector y be N, where N is the number of points in the integration window. The value of N is selected as part of the design process and is a trade-off between processing gain and complexity. N consecutive points of y will be referred to as a segment corresponding to a correlation length.

In a wireless communication system, the columns of the matrix H represent the various coded signals of interest and the elements of the vector $\theta$ are the amplitudes of the respective coded signals. For example, in the base station to mobile link of a cdmaOne system, the coded signals may include the various channels, i.e., pilot, paging, synchronization and traffic, of each base station's line-of-sight (LOS) or multipath signals. In the mobile to base station link, the columns of the matrix H may be the coded signals from a mobile LOS and/or one of its multipath signals.

In a GPS system, the columns of the matrix H are the coded signals being broadcast by the GPS satellites at the appropriate code, phase and frequency offsets.

In an array application, the columns of the matrix are steering vectors, or equivalent array pattern vectors. These vectors characterize the relative phase recorded by each antenna in the array as a function of the location and motion dynamics of the source as well as the arrangement of the antennas in the array. In the model presented above, each column of the matrix H signifies a steering vector corresponding to a particular source.

Equation (1) may now be written in the following matrix form:

$$y = H\theta + S\phi + n \quad (2)$$

$$= [HS]\begin{bmatrix}\theta \\ \phi\end{bmatrix} + n$$

where

H: spread signal matrix of the signal of interest $\theta$: amplitude vector of the source of interest $S = [s_2 \ldots s_p]$: spread signal matrix of all the other signals, i.e., the interference $\phi = [\phi_2 \ldots \phi_p]$: interference amplitude vector Baseline receivers correlate the measurement, y, with a replica of H or a column vector of H to determine if H or the column vector is present in the measurement. If H is detected, then the receiver knows the bit-stream transmitted by source number 1. Mathematically, this correlation operation is:

$$\text{correlation function} = (H^T H)^{-1} H^T y \quad (3)$$

where $T$ is the transpose operation.

Substituting for y from equation (2) illustrates the source of the power control requirement:

$$(H^T H)^{-1} H^T y = (H^T H)^{-1} H^T (H\theta + S\phi + n) \quad (4)$$

$$= (H^T H)^{-1} H^T H\theta + (H^T H)^{-1} H^T S\phi + (H^T H)^{-1} H^T n$$

$$= \theta + (H^T H)^{-1} H^T S\phi + (H^T H)^{-1} H^T n$$

The middle term, $(H^T H)^{-1} H^T S\phi$, in the above equation is the source of the near-far problem. If the codes are orthogonal, then this term reduces to zero, which implies that the receiver has to detect $\theta$ in the presence of noise, i.e., $(H^T H)^{-1} H^T n$ only. As the amplitudes of the other sources with non-orthogonal codes increase, the term $(H^T H)^{-1} H^T S\phi$ contributes a significant amount to the correlation, which interferes with the detection of $\theta$.

The normalized correlation function, $(H^T H)^{-1} H^T$, defined above, is in fact a matched filter and is based on an orthogonal projection of y onto the space spanned by H. When H and S are not orthogonal to each other, there is leakage of the components of S into the orthogonal projection of y onto H. This leakage is geometrically illustrated in FIG. 1. Note in FIG. 1, that if S were orthogonal to H, the leakage component is zero as is evident from equation 4. The CSPE utilizes projective methods to provide a solution to this interference leakage issue.

The coded signal-processing engine (CSPE) was designed to address non-orthogonal leakage. The CSPE may mitigate at least two types of interference: cross-channel and co-channel. The first kind of interference results from one source's signals bleeding into the acquisition and tracking channels of another source. This will be referred to as cross-channel interference. The second type of interference occurs when one or more signals, e.g, a line-of-sight and/or multipath signal, interfere with the ability to acquire a second, third or fourth multipath signal from the same source. This type of interference will be referred to as co-channel interference.

The analysis of cross-channel and co-channel interference mitigation begins by considering the measurement model of equation (2). An orthogonal projection onto the space spanned by the columns of H and S may be decomposed as shown in FIG. 2.

$$P_{HS} = P_S + P_{P_S^\perp H} = P_S + P_G \quad (5)$$

where: $P_S = S(S^T S)^{-1} S^T$, $P_{P_S^\perp H} = P_S^\perp H (H^T P_S^\perp H)^{-1} H^T P_S^\perp$ and $P_S^\perp = I - P_S$ are projection matrices, and $G = P_S^\perp H$.

Two cases of the detection problem were considered. In the first case, it is assumed that the measurement noise variance is known, while in the second case it is assumed that it is unknown.

Case 1: Known Measurement Noise Variance

Assuming that the variance of the measurement noise is known to be $\sigma^2$, the test statistic for detecting signals in the subspace H, with interference from S is given by Scharf L. L. and B. Friedlander, *"Matched Subspace Detectors,"* IEEE Trans Signal Proc SP-42:8, pp. 2146–2157 (August 1994):

$$\phi(y) = \frac{y^T P_G y}{\sigma^2} \tag{8}$$

Case 2: Unknown Measurement Noise Variance

The uniformly most powerful (UMP) test for detecting contributions from H, while rejecting contributions from S, when the measurement noise variance is unknown, has been derived in the literature and is given by:

$$\phi(y) = \frac{y^T P_G y}{y^T P_S^\perp P_G^\perp P_S^\perp y} \tag{9}$$

A concept presented by Scharf & Friedlander is to project the measurement y onto the space G and to perform the detection test in G. This projection onto G may be viewed in the following equivalent ways: parallel to the space S, perpendicular to the space that is perpendicular to S, and oblique to the space H.

Therefore, an efficient process by which an interference matrix may be constructed for the purpose of interference mitigation in the reception of coded signals is needed. In addition, a method and apparatus is needed that will construct an interference matrix for a coded signal-processing engine (CSPE). Several specific methods are discussed to implement the method and apparatus to provide efficient signal cancellation, which may facilitate acquisition, tracking and demodulation of the signal of interest.

SUMMARY OF THE INVENTION

It is therefore an object of the present invention to provide a method for constructing an interference matrix S to provide interference mitigation through its use in a coded signal-processing engine (CSPE) to facilitate acquisition, tracking and demodulation of the signal of interest.

It is a further object to provide a method for providing interference mitigation, without requiring knowledge of absolute power, using various methods of constructing the interference matrix S. Interference selected for cancellation may include a plurality of channels from each transmitter, a plurality of transmitters and a plurality of multipath signals.

It is yet another object to provide a method for the cancellation of one or a plurality of channels from one transmitter.

It is yet another object to provide a method for the cancellation of one or a plurality of channels from a plurality of transmitters.

It is yet another object to provide a method for the cancellation of a plurality of channels from one transmitter and a plurality of its multipath signals.

It is yet another object to provide a method for the cancellation of a plurality of channels from a plurality of transmitters and a plurality of multipath signals.

It is yet another object to provide interference mitigation using no knowledge of relative signal amplitude between the channels, absolute power of the channels or the bits transmitted.

It is yet another object to provide interference mitigation using knowledge of the bits transmitted, but no knowledge of relative signal amplitude between the channels or absolute power of the channels.

It is yet another object to provide interference mitigation with knowledge of relative signal amplitude between the channels, but no knowledge of the absolute power of the channels.

It is yet another object to provide interference mitigation by combinations of the above embodiments.

In all of the above embodiments, it is an object to provide an improved method for interference mitigation.

Finally, it is an object of the invention to provide a method for constructing the interference matrix S for use in the CSPE for interference mitigation.

According to one broad aspect of the present invention, there is provided a method for constructing an interference matrix S. The interference matrix, used by the CSPE module in the receiver architecture, may mitigate interference and provide better acquisition, tracking and demodulation of coded signals based on signal to noise ration (SNR) or bit error rate (BER). Furthermore, it may provide for the acquisition, tracking and demodulation of coded signals that were previously concealed by interference.

According to one broad aspect of the present invention, there is provided a method for generating an interference matrix S, the method comprising the steps of: A) Determining the number of active channels N in a transmitter; B) Selecting the transmitters to be canceled and assigning the transmitters sequentially to the variable t; C) Selecting the channels to be cancelled and assigning the channels sequentially to the variable n, where n is less than or equal to N; D) Determining if a multipath signal should be canceled and assigning the multipaths of interest to the respective variable M; E) Generating a sequence of column vectors of the form $V = st_{0-n}^{0-M}$ where $st^0$ represents the line of sight (LOS) interference signal from the channel to be cancelled of the transmitter to be cancelled and M>0 representing the multipaths interference signals of interest; F) Repeating steps B, C, D and E for each column vector of interest over the channel subscript from 0 to n, over the multipath superscript from 0 to M and over the transmitter variable t; and G) Defining the S matrix as $S = [V_1 \ V_2 \ldots V_c]$ wherein the index denotes the column index c.

According to another broad aspect of the present invention, there is provided an apparatus for generating an interference matrix S, the apparatus comprising: means for determining the number of active channels N in a transmitter; means for electing the transmitters to be canceled and assigning the transmitters sequentially to the variable t; means for electing the channels to be cancelled and assigning the channels sequentially to the variable n, where n is less than or equal to N; means for determining if a multipath signal should be canceled and assigning the multipaths of interest to the respective variable M; and means for generating a sequence of column vectors of the form $V = st_{0-n}^{0-M}$ where $st^0$ represents the line of sight (LOS) interference signal from the channel to be cancelled of the transmitter to be cancelled and M>0 representing the multipaths interference signals of interest; wherein the S matrix is defined as $S = [V_1 \ V_2 \ldots V_c]$ and wherein the index denotes the column index c.

According to another broad aspect of the present invention, there is provided a method for generating an interference matrix S, the method comprising the steps of: A) Determining the number of active channels N in a transmitter; B) Selecting the transmitters to be canceled and assigning the transmitters sequentially to the variable t; C) Selecting the channel to be cancelled and assigning the channels sequentially to the variable n, where n is less than or equal to N; D) Determining if a multipath signal should be canceled and assigning the multipaths of interest to the respective variable M; E) Generating a sequence of column vectors of the form $V=s_b t_{0-i}^{0-M}$ where $s_b t_i^0$ represents the line of sight (LOS) interference signal from the channel to be cancelled of the transmitter to be cancelled where the knowledge of bits is known and M>0 representing the multipaths interference signals of interest; F) Repeating steps B, C, D and E for each column vector of interest over the channel subscript from 0 to i, over the multipath superscript from 0 to M and over the transmitter variable t; and G) Defining the S matrix as $S=[V_1\ V_2\ \ldots\ V_c]$ wherein the index denotes the column index c.

According to another broad aspect of the present invention, there is provided an apparatus for generating an interference matrix S, the apparatus comprising: means for determining the number of active channels N in a transmitter; means for selecting the transmitters to be canceled and assigning the transmitters sequentially to the variable t; means for selecting the channel to be cancelled and assigning the channels sequentially to the variable n, where n is less than or equal to N; means for determining if a multipath signal should be canceled and assigning the multipaths of interest to the respective variable M; and means for generating a sequence of column vectors of the form $V=s_b t_{0-i}^{0-M}$ where $s_b t_i^0$ represents the line of sight (LOS) interference signal from the channel to be cancelled of the transmitter to be cancelled where the knowledge of bits is known and M>0 representing the multipaths interference signals of interest; wherein the S matrix is defined as $S=[V_1\ V_2\ \ldots\ V_c]$ and wherein the index denotes the column index c.

According to another broad aspect of the present invention, there is provided a method for generating an interference matrix S, the method comprising the steps of: A) Determining the number of active channels N in a transmitter; B) Selecting the transmitters to be canceled and assigning the transmitters sequentially to the variable t; C) Selecting the channels to be cancelled and assigning the channels sequentially to the variable n, where n is less than or equal to N; D) Determining if a multipath signal should be canceled and assigning the multipaths of interest to the respective variable M; E) Determining the relative amplitude of the interference signal ($\theta$) corresponding to the channel, transmitter and multipath of interest; F) Multiplying an interference vector s by $\theta$ to produce the vector $s_p$; G) Generating a column vector $$V = s_p \sum_t {}^{\Sigma_M}_{\Sigma_n} = \sum_t \sum_n \sum_M s_p t_n^M$$

where $s_p t^0$ represents the line of sight (LOS) interference signal from the channel to be cancelled of the transmitter to be cancelled and M>0 representing the multipaths interference signals of interest; H) Repeating steps B, C, D, E, F and G for each column vector of interest over the channel subscript n, over the multipath superscript M and the transmitter index t; and I) Defining the S matrix as $S=[V_1\ V_2\ \ldots\ V_c]$ wherein the index denotes the column index c.

According to another broad aspect of the present invention, there is provided an apparatus for generating an interference matrix S, the apparatus comprising: means for determining the number of active channels N in a transmitter; means for selecting the transmitters to be canceled and assigning the transmitters sequentially to the variable t; means for selecting the channels to be cancelled and assigning the channels sequentially to the variable n, where n is less than or equal to N; means for determining if a multipath signal should be canceled and assigning the multipaths of interest to the respective variable M; means for determining the relative amplitude of the interference signal ($\theta$) corresponding to the channel, transmitter and multipath of interest; means for multiplying an interference vector s by $\theta$ to produce the vector $s_p$; and means for generating a column vector $$V = s_p \sum_t {}^{\Sigma_M}_{\Sigma_n} = \sum_t \sum_n \sum_M s_p t_n^M$$

where $s_p t^0$ represents the line of sight (LOS) interference signal from the channel to be cancelled of the transmitter to be cancelled and M>0 representing the multipaths interference signals of interest; wherein the S matrix is defined as $S=[V_1\ V_2\ \ldots\ V_c]$ and wherein the index denotes the column index c.

According to another broad aspect of the present invention, there is provided a method for generating an interference matrix S, the method comprising the steps of: A) Determining the number of active channels N in a transmitter; B) Selecting the transmitter to be canceled and assigning the transmitters sequentially to the variable t; C) Selecting the channel to be cancelled and assigning the channels sequentially to the variable n, where n is less than or equal to N; D) Determining if a multipath signal should be canceled and assigning the multipaths of interest to the respective variable M; E) Generating a sequence of column vectors V; F) Repeating steps B, C, D, E, F and G for each column vector of interest; and G) Defining the S matrix as $S=[V_1\ V_2\ \ldots\ V_c]$ wherein the index denotes the column index c.

According to another broad aspect of the present invention, there is provided an apparatus for generating an interference matrix S, the apparatus comprising: means for determining the number of active channels N in a transmitter; means for electing the transmitter to be canceled and assigning the transmitters sequentially to the variable t; means for selecting the channel to be cancelled and assigning the channels sequentially to the variable n, where n is less than or equal to N; means for determining if a multipath signal should be canceled and assigning the multipaths of interest to the respective variable M; and means for generating a sequence of column vectors V; wherein the S matrix is defined as $S=[V_1\ V_2\ \ldots\ V_c]$ and wherein the index denotes the column index c.

Other objects and features of the present invention will be apparent from the following detailed description of the preferred embodiment.

BRIEF DESCRIPTION OF THE DRAWINGS

The invention will be described in conjunction with the accompanying drawings, in which.

DETAILED DESCRIPTION OF THE PREFERRED EMBODIMENT

Figure 1:
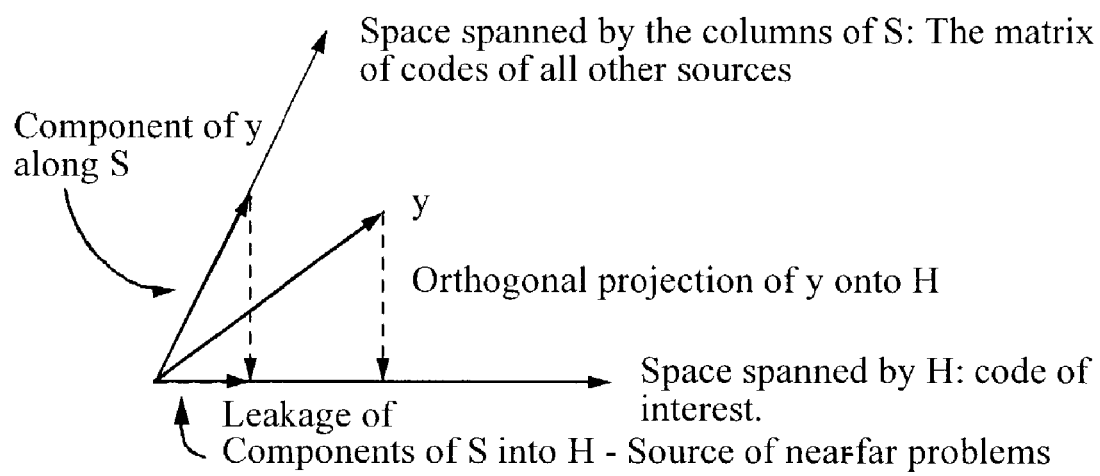
FIG. 1 is a graph illustrating the leakage of undesired source codes into the space spanned by the code of interest in a prior art coded communication system.
Figure 2:
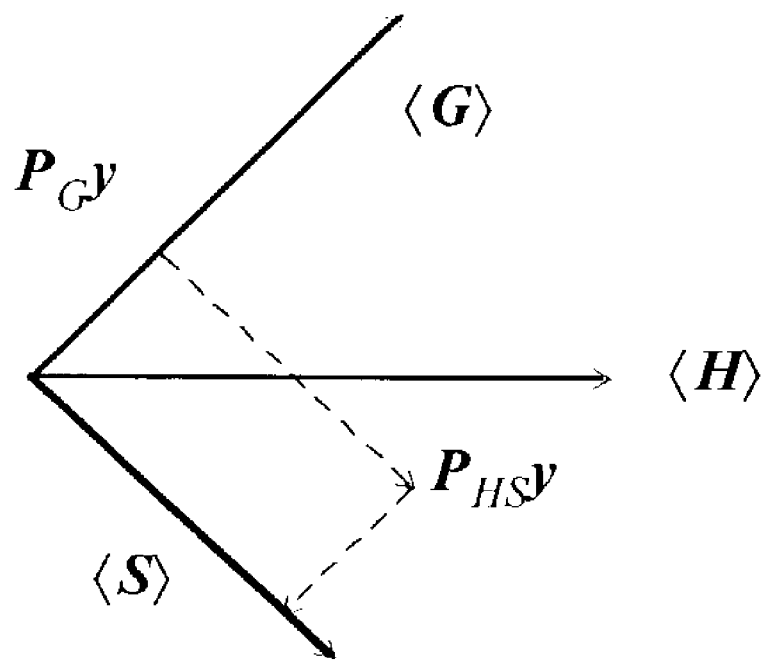
FIG. 2 is a graph illustrating the projection of a data vector onto the signal and interference subspaces in accordance with a preferred embodiment of the invention.

It is advantageous to define several terms before describing the invention. It should be appreciated that the following definitions are used throughout this application.

DEFINITIONS

Where the definition of terms departs from the commonly used meaning of the term, applicant intends to utilize the definitions provided below, unless specifically indicated.

For the purposes of the present invention, the term "analog" refers to any measurable quantity that is continuous in nature.

For the purposes of the present invention, the term "baseband" refers to a signal with zero frequency, i.e., no carrier signal.

For the purposes of the present invention, the term "base station" refers to a transmitter and receiver that is capable of communicating with multiple mobile units in a wireless environment.

For the purposes of the present invention, the term "baseline finger processor" refers to a processing finger in a baseline receiver that tracks a finger.

For the purposes of the present invention, the term "baseline receiver" refers to a conventional CDMA receiver against which an interference cancellation enabled receiver of the present invention may be compared.

For the purposes of the present invention, the term "basis" refers to a set of basis vectors that completely span the space under consideration. For example, in 3-D space, any three linearly independent vectors comprise a "basis" for the 3-D space, and for 2-D space, any 2 vectors that are linearly independent comprise a "basis."

For the purposes of the present invention, the term "bit" refers to the conventional meaning of "bit," i.e., a fundamental unit of information having one of two possible values; a binary 1 or 0.

For the purposes of the present invention the term "Code-Division Multiple Access (CDMA)" refers to a method for multiple access in which all users share the same spectrum but are distinguishable from each other by a unique code.

For the purposes of the present invention, the term "channel" refers to a logical conduit from a transmitter, distinguished by a unique PN code or code offset, over which a transmitter may broadcast a message. For example, a base station communicating with multiple mobile units, broadcasts to each mobile on a separate channel in order to differentiate messages intended for different mobiles.

For the purposes of the present invention, the term "chip" refers to a non-information bearing unit that is smaller than a bit, the fundamental information bearing unit. Use of spreading codes produce fixed length sequences of chips that constitute bit(s).

For the purposes of the present invention the term "code" refers to a specified sequence of numbers that is applied to a message and is known by the intended recipient of the message.

For the purposes of the present invention the term "Code-Division Multiple Access (CDMA)" refers to a method for multiple access in which all users share the same spectrum but are distinguishable from each other by a unique code.

For the purposes of the present invention, the term "code offset" refers to a location within a code. For example, base stations in certain wireless environments distinguish between each other by their location within a code, often a pseudorandom number (PN) sequence.

For the purposes of the present invention, the term "co-channel interference" refers to the type of interference that occurs when one or more signals, e.g., a line-of-sight signal; interferes with the ability to acquire a second, third or other multipath signal from the same source.

For the purposes of the present invention, the term "correlation" refers to the inner product between two signals scaled by the length of the signals. Correlation provides a measure of how alike two signals are. The operation consists of element-wise multiplication, the addition of the resulting product terms and division by the number of elements. If the result is complex, the magnitude is typically taken of the result.

For the purposes of the present invention, the term "composite interference vector (CIV)" refers to an interference reference vector formed as a linear combination of interference vectors scaled according to each channel's relative amplitude.

For the purposes of the present invention, the term "composite method" refers to a method of cancellation in which composite interference vectors are used for the purpose of interference cancellation.

For the purposes of the present invention, the term "cross-channel interference" refers to the type of interference that results from one source's signals bleeding into the acquisition and tracking channels of another source.

For the purposes of the present invention, the terms "decomposition" and "factorization" refer to any method used in simplifying a given matrix to an equivalent representation.

For the purposes of the present invention, the term "digital" refers to the conventional meaning of the term digital, i.e., relating to a measurable quantity that is discrete in nature.

For the purposes of the present invention, the term "Doppler" refers to the conventional meaning of the term Doppler frequency, i.e., a shift in frequency that occurs due to movement of a receiver, transmitter and/or background that alters the properties of the channel.

For the purposes of the present invention, the term "Dynamically Selected" or "Dynamically Determined" refers to the process by which channels are selected to be included in the construction of the interference matrix based on dynamic criteria. For example, the number of active channels p may be dynamically selected by selecting those that exceed a specified threshold, a subset of the strongest channels based upon the ranking of channels or by other such methods of selection; the multipath of interest M may be dynamically selected based upon a threshold criterion or a subset based upon a ranking procedure; the transmitter of interest t may be dynamically selected based upon a threshold criterion or a subset based upon a ranking procedure; and where the channels to be canceled n is dynamically selected by a threshold criterion or a subset based upon a ranking procedure.

For the purposes of the present invention, the term "finger" refers to a signal processing entity in a receiver that may be capable of tracking and demodulating a signal. A receiver is comprised of multiple fingers, each of which is assigned to either a unique source or a multipath version of an assigned source.

For the purposes of the present invention, the product $S^T S$ where S denotes a matrix, is called the "Grammian" of S.

For the purposes of the present invention, the term "Global Positioning System (GPS)" refers to the conventional meaning of this term, i.e., a satellite-based system for position location.

For the purposes of the present invention, the term "inphase" refers to the component of a signal that is aligned in phase with a particular signal, such as a reference signal.

For the purposes of the present invention, the term "interference" refers to the conventional meaning of the term interference, i.e., a signal that is not of interest but that interferes with the ability to detect the signal of interest. Generally, interference is structured noise that is created by other processes that are attempting to do the same thing as with the signal of interest, e.g., other base stations communicating with mobiles, or multipath versions of the signal of interest.

For the purposes of the present invention, the term "linear combination" refers to the combining of multiple signals or mathematical quantities in an additive way with nonzero scaling of the individual signals.

For the purposes of the present invention, a vector is "linearly dependent" with respect to a set of vectors if it may be expressed as an algebraic sum of any of the set of vectors.

For the purposes of the present invention, the term "LOS signal" refers to the line-of-sight signal that follows the direct path from receiver to transmitter. If all signals follow non-direct paths, then the first and likely strongest signal that arrives at the receiver may be referred to as the LOS signal.

For the purposes of the present invention, the term "matched filter" refers to a filter that is designed to facilitate the detection of a known signal by effectively correlating the received signal with an uncorrupted replica of the known signal.

For the purpose of the present invention, the term "matrix inverse" refers to the inverse of a square matrix S, denoted by $S^{-1}$, that is defined as that matrix which when multiplied by the original matrix equals the identity matrix, I, i.e., a matrix which is all zero save for a diagonal of all ones.

For the purposes of the present invention, the term "misalignment" refers to a situation in which modulated symbols from different transmission channels or sources do not align temporally, i.e., the boundaries of the symbols do not align with each other.

For the purposes of the present invention, the term "mobile" refers to a mobile, wireless unit which functions as a transmitter and receiver, communicating with base stations.

For the purposes of the present invention, the term "modulation" refers to imparting information on a signal. Typically, this is accomplished by manipulating signal parameters, such as phase, amplitude, frequency or a plurality of these quantities.

For the purposes of the present invention, the term "multipath" refers to copies of a signal that travel different paths between the transmitter and the receiver.

For the purposes of the present invention, the term "multipath finger" refers specifically to either an LOS or multipath signal from a single source. Moreover, it may consist of a plurality of channels. For example, an IS-95 multipath finger may consist of the pilot, paging, synchronization channels and a plurality of traffic channels.

For the purposes of the present invention, the term "noise" refers to the conventional meaning of noise with respect to the transmission and reception of signals, i.e., a random disturbance that limits the ability to detect a signal of interest. Specifically, it refers to processes that are attempting to do something different than the signal of interest. Additive noise adds linearly with the power of the signal of interest. Examples of noise in cellular systems may include automobile ignitions, power lines and microwave communication links.

For the purposes of the present invention, the term "norm" refers to a measure of the magnitude of a vector.

For the purposes of the present invention, the term "normalization" refers to a scaling relative to another quantity.

For the purposes of the present invention, two nonzero vectors, $e_1$ and $e_2$ are said to be "orthogonal" if their inner product (defined as $e_1^T e_2$, where $^T$ refers to the transpose operator) is identically zero. Geometrically, this refers to vectors that are perpendicular to each other.

For the purposes of the present invention, any two vectors are said to be "orthonormal" if, in addition to being orthogonal, each of their norms are unity. Geometrically, this refers to two vectors that, in addition to lying perpendicular to each other, are each of unit length.

For the purposes of the present invention, the term "processing finger" refers to a signal-processing element in a receiver that tracks a single multipath finger and processes a single channel contained in that multipath finger. Namely, each processing finger tracks a LOS or single multipath finger copy of a channel.

For the purposes of the present invention, the term "processing gain" refers to the signal to noise ratio (SNR) of the processed signal to the SNR of the unprocessed signal.

For the purposes of the present invention, the term "projection", with respect to any two vectors x and y, refers to the projection of the vector x onto y in the direction of a y with a length equal to that of the component of x, which lies in the y direction.

For the purposes of the present invention, the term "pseudorandom number (PN)" sequences refer to sequences that are often used in spread spectrum applications as codes to distinguish between users while spreading the signal in the frequency domain.

For the purposes of the present invention, the term "quadrature" refers to the component of a signal that is 90° out of phase with a particular signal, such as a reference signal.

For the purposes of the present invention, the term "quasi-orthogonal functions (QOF)" refers to a set of covering codes used in cdma2000. QOFs are orthogonal to codes within a set, but between different QOF sets and Walsh codes there exists non-zero correlation between at least one pair of codes from these different sets.

For the purposes of the present invention, the term "rake receiver" refers to an apparatus for combining multipath signals in order to increase the SNR.

For the purposes of the present invention, the term "rank" refers to the dimensionality of the row space and the column space of a matrix. In the CSPE, the number of independent interference vectors included as columns in the matrix S determines the rank of the interference matrix.

For the purposes of the present invention, the term "signal to noise ratio (SNR)" refers to the conventional meaning of signal to noise ratio, i.e., the ratio of the signal to noise (and interference).

For the purposes of the present invention, the term "singular matrix" refers to a matrix for which the inverse does not exist. In a "singular matrix" at least one of the row or column vectors is not linearly independent of the remaining vectors. Moreover, the matrix has a determinant of zero.

For the purposes of the present invention, the term "spread spectrum" refers to a method of using spreading codes to increase the bandwidth of a signal to more effectively use bandwidth while being resistant to frequency selective fading.

For the purposes of the present invention, the term "spreading code" refers to pseudorandom number sequences that are used to increase the width of the signal in frequency space in spread spectrum systems. Examples of spreading codes include: Gold, Barker, Walsh codes, etc.

For the purposes of the present invention, the term "steering vector" refers to a vector that contains the phase history of a signal that is used in order to focus the signal of interest.

For the purposes of the present invention, the term "symbol" refers to the fundamental information-bearing unit transmitted over a channel in a modulation scheme. A symbol may be composed of one or more bits that may be recovered through demodulation For the purposes of the present invention, the term "transpose" refers to a mathematical operation in which a matrix is formed by interchanging rows and columns of another matrix. For example, the first row becomes the first column; the second row becomes the second column, and so on.

DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the spirit and scope of the invention. The following detailed description is, therefore, not to be taken in a limiting sense.

The forward link of a communication system includes a plurality of base stations or sources that are configured for radio communication with one or more receivers or mobile units, such as wireless telephony devices. The mobile units are configured to receive and transmit direct sequence code division multiple access (DS-CDMA) signals to communicate with a plurality of base stations. The base station transmits radio frequency (RF) signals, the RF signals formed by modulating an RF carrier with a baseband signal. The baseband signal is formed by spreading data symbols with a periodic spreading sequence having a period substantially greater than the number of chips per symbol.

In a CDMA system, each source and each receiver is assigned a unique time varying code that is used to spread that source's digital bit stream. These spread signals from all sources are observed by the receiver and the received signal may be modeled as a linear combination of signals from a plurality of sources in additive noise. The weighting of each source is determined from the amplitude of each source's signal and the square of the amplitude represents the transmission power of the source. Signals intended for other receivers appear as structured interference.

Figure 3:
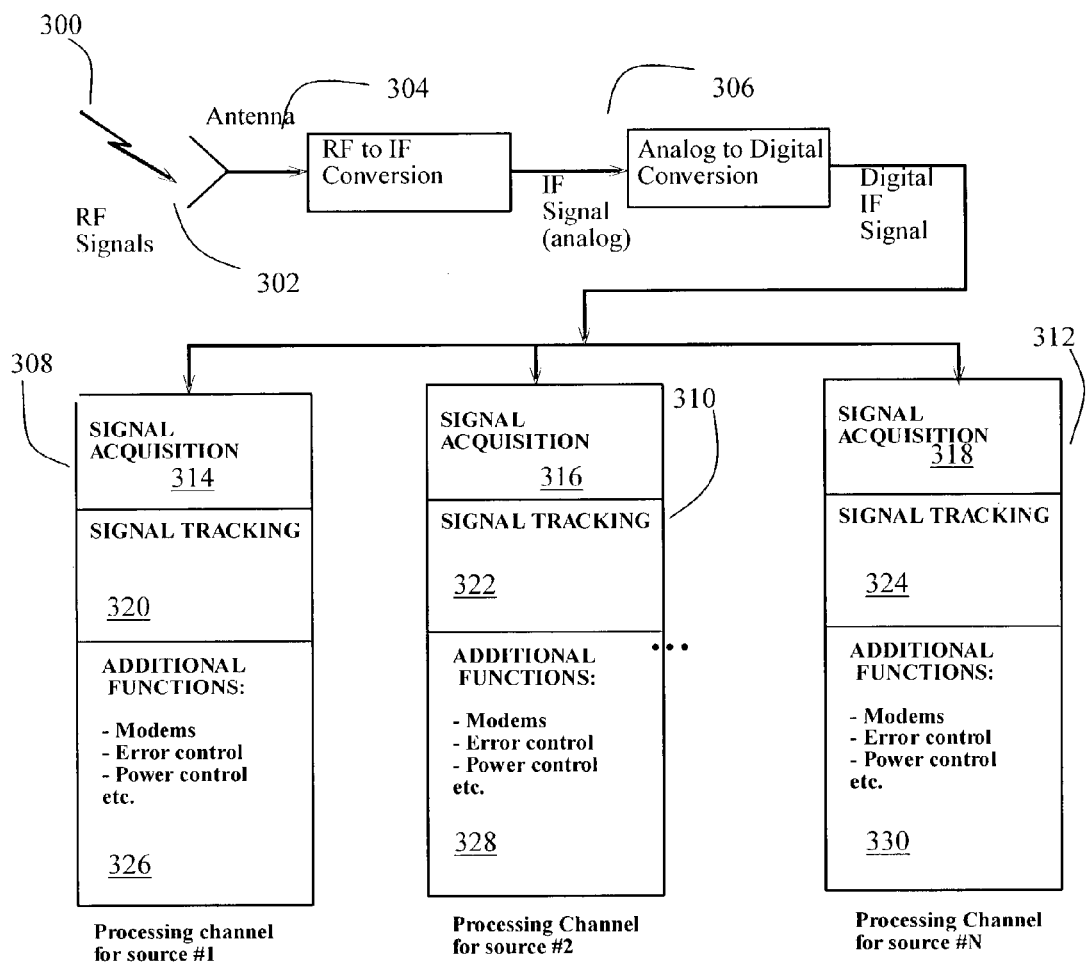
FIG. 3 is a block diagram of the processing architecture of a conventional, baseline PN coded receiver.

The processing architecture of current PN coded receivers is illustrated in FIG. 3. A PN coded signal 300 at radio frequency (RF) is received at receiver antenna 302. Frequency down-conversion from RF to intermediate frequency (IF) is performed by conversion circuit 304 prior to sampling and conversion from analog to digital by an A/D circuit 306. The digital IF signal is passed to a number of processing channels 308, 310 and 312 that may perform signal processing operations of acquisition, tracking and demodulation. It should be appreciated that any number of signal processing channels may be utilized in conjunction with the teachings of the present invention. While the detailed description may include signal acquisition in each receiver finger, the invention is inclusive of receivers that do not perform signal acquisition individually in each finger. For illustrative purposes, only three fingers, 308, 310, and 312 have been illustrated. However, the invention is not limited to that number of fingers, but instead is inclusive of an arbitrary number of processing fingers. Additional processing stages A, B and C may be included in each processing channel. Furthermore, in all descriptions the signals are not decomposed into in-phase (I) and quadrature (Q) components. However, the receiver architectures depicted are inclusive of receivers that perform this decomposition into I and Q and process these representations separately.

The baseline receiver converts the received signal from a radio frequency (RF) signal 300 to either an intermediate frequency (IF) or baseband signal and then discretely samples the digital signal generated by A/D circuit 306. In the detailed description, IF will be inclusive of the case of a zero frequency carrier, namely baseband. For example, the RF reference signal is given as:

$$s_{RF}(t)=\cos(\omega_{RF}t+m) \quad (5)$$

where $\omega_{RF}$ is the RF angular frequency and m is one of the four possible values of phase in $\pi/4$-QPSK.

Effectively, the baseline receiver multiplies received RF signal 300 by a reference carrier to produce a signal composed of an IF or baseband component and a high frequency component.

$$s(t)=s_{RF}(t)*2\cos(\omega t)=\cos((\omega_{RF}-\omega)t+m)+\cos((\omega_{RF}+\omega)t+m) \quad (6)$$

Low-Pass Filtering removes the high frequency component and yields the analog signal defined by:

$$s(t)=\cos((\omega_{RF}-\omega)t+m) \quad (7)$$

which may be discretely sampled to provide digital data downstream of converter 306.

Within each processing channel shown in FIG. 3, we focus on signal acquisition (314, 316 and 318) and signal tracking functions (320, 322 and 324) within a channel. Note that an alternative embodiment has a single acquisition finger that is shared by all other processing fingers, eliminating the need for an acquisition stage in every processing finger. Blocks 326, 328 and 330 may be provided to perform additional functionality. These functions are presented in FIG. 4 and discussed in detail, below.

Figure 4:
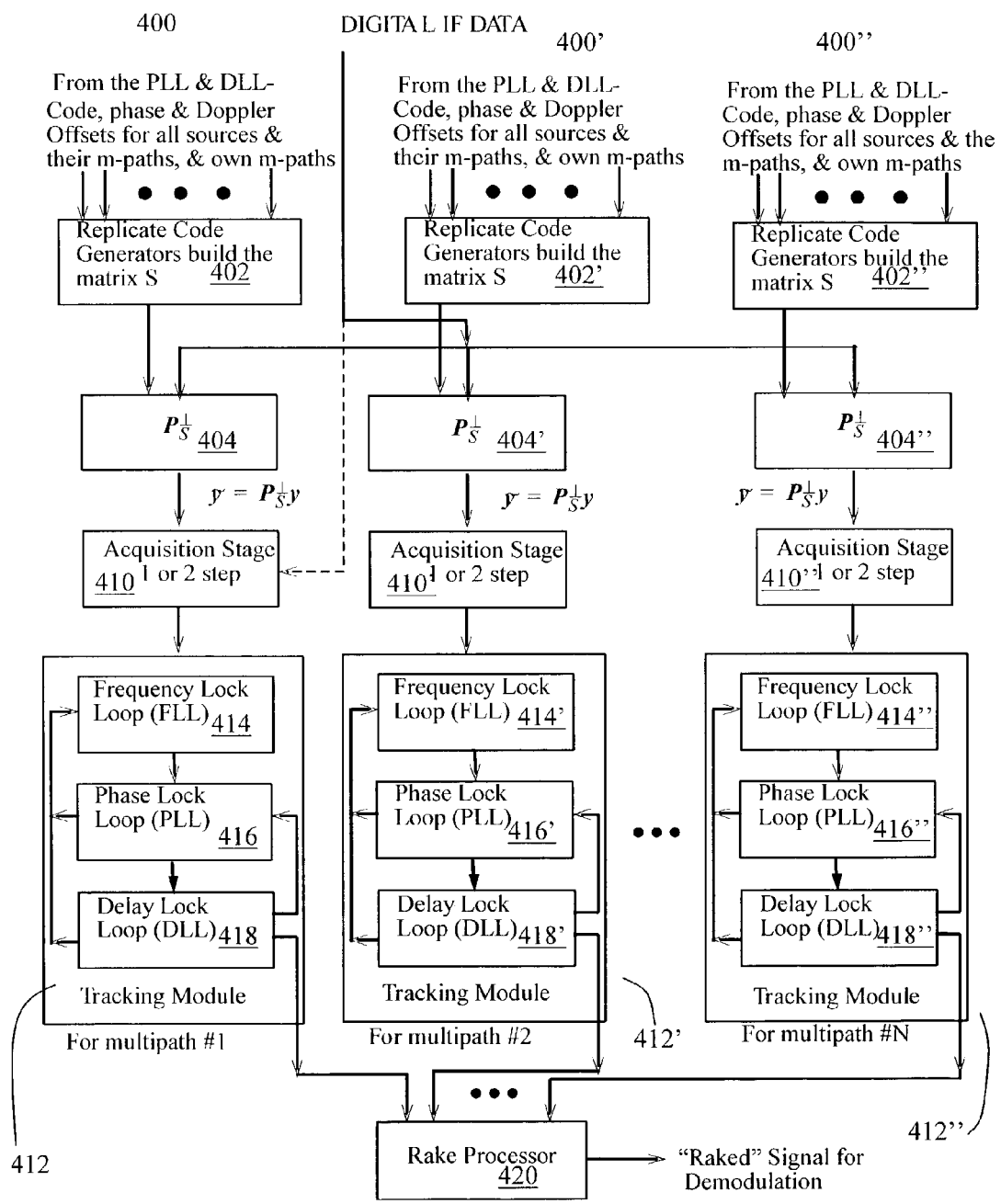
FIG. 4 is a depiction of the architecture for the simultaneous mitigation of both cross and co-channel interference constructed in accordance with a preferred embodiment of the invention.

In FIG. 4 the architectural layout is presented of a single data processing channel for eliminating both cross-channel and co-channel interference. A single data processing channel is designed to acquire and track the signal from a single source.

In the architecture presented, the single data processing channel consists of multiple fingers 400, 400' and 400" where each finger consists of a code generation module 402, 402' and 402" (for building S matrix); $P_S^\perp$ modules 404, 404' and 404"; an acquisition module 410, 410', and 410" and a tracking module 412, 412' and 412". The tracking module consists of frequency lock loops (FLLs) or frequency estimators 822, 822' and 822"; phase locked loops or phase estimators (PLLs) 420, 420' and 420"; as well as delay locked loops or code offset estimators (DLLs) 818, 818' and 818". Each processing finger 400, 400' and 400" within a channel has the function of acquiring and tracking a distinct multipath signal from the same source. While only three fingers are depicted, this invention is inclusive of an arbitrary number of fingers.

In order to understand how the architecture depicted in FIG. 4 works, the starting assumption may be used that this channel has just been assigned to track the signals from a particular source and that the system is already in the process of acquiring and tracking other sources.

The input data to this channel arrives in the form of a digital IF data stream. Since there are other sources being tracked, replicate code generator module 402, 402' and 402" would generate the appropriate S matrix and this matrix is used to create $P_S^\perp$ 404, 404' and 404". In this case, the digital IF data stream y is provided as input into $P_S^\perp$ module. The output of this module 404 is fed into acquisition module 410 in the same finger. However, this invention is also inclusive of a single acquisition module architecture, in which the results are provided to a plurality of tracking fingers.

In case the system was not tracking any other sources, then there would be no S matrix generated and therefore no $P_S^\perp$ function. In this case, the input digital IF data stream is passed directly into the acquisition stage.

The acquisition stage identifies the LOS signal and all its multipath copies from the source of interest. If the acquisition stage identifies more than one multipath, then multiple tracking sections are used for each multipath signal individually. The outputs of tracking stages 412, 412' and 412" may be the code, phase, and Doppler offsets that are used to build the S matrix in the other channels.

Now suppose that due to co-channel interference, acquisition stage 410 was only able to acquire fewer multipaths than there are available processing fingers, i.e., a plurality of multipath signals are buried in co-channel interference. In that case, the information from the acquisition stage is used to track the signals identified. Information about the code, phase and Doppler offsets of the first signals being tracked are obtained from tracking system 412 and are provided as input into replicate code generator modules 402' and 402" and are used in producing a reference code that includes the correct code offset, phase and/or frequency.

As a result, the S matrix built in processing finger 400' includes the code of the lone signal being processed in finger 400. As a result, finger 400' will eliminate interference from all the other sources as well as the dominant signal from the source of interest tracked by processing finger 400. Acquisition module 410' in processing finger 400' then acquires the multipath signal which is now visible because interference from the dominant signal has been eliminated. That multipath is then tracked in tracking module 412' and the tracking information may be provided to both finger 400 (to improve its ability to track the dominant signal) as well as to the other fingers, e.g., 400" to aid in identifying and tracking additional weak multipath signals. The tracking information from all these modules is used to perform Rake combining operation 420 for data demodulation.

Now that the overall system architecture has been discussed, the discussion will focus on the creation of interference matrix S. The interference matrix S is a column matrix composed of interference signal vectors s and is of the form $[s_1 \ s_2 \ldots s_p]$. It is an N×p matrix where N denotes the segment length of the signal and p is the number of interference signal vectors where p may be dynamically selected. The number of active channels p may be dynamically selected by selecting those that exceed a specified threshold, a subset of the strongest channels based upon the ranking of channels or by other such methods of selection. The determination of the p channels to be included in the construction of interference matrix S may be performed for each symbol (at the symbol rate) or if the cancellation is performed over more than one symbol, the determination may be determined at that rate. Each column vector s is of the form $[s(t_0) \ s(t_1) \ldots s(t_N)]^T$ where $s(t_i)$ denotes a discrete signal, part of a signal or composite signal, sampled in time. The rank of the matrix is p, where $p \geq N$, to avoid rank deficiency.

In the following discussion, each vector s will be specified with a number of indices, i.e., $s_i j_k^m$, where the subscript i denotes whether the method uses additional information such as bits transmitted or relative power, j is the transmitter identification number, the subscript k is the channel identification number and the superscript m is the multipath identification number (line-of-sight (LOS) is 0 and the multipath signals are 1, 2, 3, and so on based on time of arrival at the receiver). The i subscript is 'b' if the method uses knowledge of bits transmitted, 'p' if the method uses relative signal amplitude or the subscript is absent for methods that do not use knowledge of bits transmitted or signal amplitude.

The simplest construction of S uses no knowledge of symbols transmitted or relative signal amplitude. However, use of knowledge of the symbols transmitted in the construction of S may be used to resolve ambiguities that may appear due to symbol boundary misalignment. If a symbol changes value in successive intervals it may interfere with the construction of interference matrix S. If the symbols are estimated through relative power computations or by determining the bit(s) transmitted and used in the construction of S then boundary alignment problem between multiple signals is effectively solved. Boundary misalignment problems occur whenever an interference vector is constructed that contains any portion of more than one modulated symbols.

Furthermore, another method for cancellation is the composite method that facilitates rank reduction of S by using information of the relative signal amplitude of the interfering signal channels. The amplitude of each channel is estimated and that estimate is used to scale each replica signal.

Construction of interference matrix S will be categorized into four primary embodiments with secondary embodiments under each. The primary embodiments consist of the construction of interference matrix S for a single transmitter, multiple transmitters, a single transmitter with multipath and multiple transmitters with multipath. Each primary embodiment includes different representations in the sections containing the secondary embodiments. These representations include the following categories: no knowledge of bits transmitted or power; knowledge of bits transmitted, but not of power; and knowledge of relative signal amplitude.

Single Transmitter with No Multipath

The simplest embodiment is an interference matrix S constructed for the cancellation of only one transmitter with one or more channels, where each channel is distinguished by a unique PN code. This method for constructing S is discussed in the following subsections.

No Knowledge

Cancellation of one channel without any knowledge of power or bits transmitted is accomplished using the following interference matrix S:

$$S=[s1_1^0]$$

Without loss of generality, the s vector represents the line of sight (LOS) interference signal from channel 1 of transmitter one. The indices may be changed according to the transmitter and channel to be cancelled without departing from the teachings of the present invention.

Cancellation of more than one channel from the same transmitter without any knowledge may be accomplished using a multi-rank S of the following type:

$$S=[s1_1^0 \ s1_2^0 \ldots s1_n^0]$$

Without loss of generality, the transmitter has at least n active channels and S is comprised of a subset of vectors corresponding to these channels. Thus, the interference matrix may be composed of any number of column vectors less than or equal to the segment length N without departing from the teachings of the present invention.

It should be appreciated that the above-identified specific examples are provided to illustrate the concepts of constructing the interference matrix S, the inventive concept is not limited to the specific example.

Knowledge of Bits Transmitted

Another method for constructing single and multi-rank interference matrices S is to use knowledge of the bits transmitted. The construction of S is similar to the no knowledge case. Cancellation of one channel with knowledge of bits transmitted is accomplished using the following S:

$$S=[s_b 1_1^0]$$

Without loss of generality, the s vector represents the LOS interference signal of channel 1 from transmitter one. Specifically, $s_b$ is defined as an interference reference vector constructed using bit info. The indices may be changed according to the transmitter and channel to be cancelled.

Cancellation of more than one channel from the same transmitter with knowledge of bits transmitted may be accomplished using a multi-rank interference matrix S, such as the following:

$$S=[s_b 1_1^0 \ s_b 1_2^0 \ldots s_b 1_n^0]$$

Without loss of generality, the transmitter has at least n active channels and S is comprised of a subset of these signal vectors. Thus, the interference matrix may be composed of any number of column vectors less than or equal to the segment length N without departing from the teachings of the present invention.

It should be appreciated that the above-identified specific examples are provided to illustrate the concepts of constructing interference matrix S, the inventive concept is not limited to the specific example.

Knowledge of Relative Signal Amplitude

Another method for constructing interference matrix S is to use the relative signal amplitudes of the channels. As in the previous methods discussed in this embodiment, it is possible to form a single rank interference matrix S for one channel or a multi-rank interference matrix S for multiple channels. However, an advantage to the composite interference vector (CIV) method is that it provides rank reduction, i.e., a reduction in the rank of interference matrix S while still providing cancellation of multiple channels, corresponding to a higher rank S. The previous methods cancel the same number of interference signal vectors as the rank of S, while rank reduction allows for the cancellation of a greater number of signal vectors than the rank of interference matrix S.

While the previous methods do not require any knowledge of power, this composite method requires estimation of the relative signal amplitude of the channels to be cancelled. The simplest embodiment is that of a single rank S that consists of multiple channels. Form the composite interference vector:

$$s_p 1_{\Sigma_k}^0 = \sum_k s_p 1_k^0$$

Where the subscript p denotes that relative signal amplitude is used in constructing the interference signals that are summed over channel index k. For the following discussion, vector $s_p$ is defined as the interference vector scaled by the amplitude, specifically $s_p = s\theta$ where $\theta$ is the amplitude including sign. For example, if the channels to be canceled are 1–3, 5, 7 then the index k ranges from 1–3, 5, 7. Moreover, the composite interference vector may be represented as $s_p 1_{1-3,5,7}^0$. Thus, the composite interference vector effectively contains the information of several interference signals in a compact form.

This composite interference vector may be used in the construction of a single rank interference matrix S that uses knowledge of relative signal amplitude:

$$S=[s_p 1_{1-3,5,7}^0]$$

without loss of generality, this single rank matrix will effectively cancel channels 1–3, 5 and 7 of the LOS from one transmitter.

Additionally, multi-rank interference matrices may be constructed from several composite interference vectors. Without loss of generality, the following interference matrix may be constructed to cancel a plurality of channels of one transmitter with a plurality of composite interference vectors:

$$S=[s_p1_{1-4,8}{}^0 \, s_p1_{5,6}{}^0 \, s_p1_{7,9-10,13}{}^0]$$

The first signal vector effectively cancels channels 1–4 and 8; the second vector cancels channels 5 and 6; and the third vector cancels channels 7, 9–10 and 13.

It should be appreciated that the above-identified specific examples are provided to illustrate the concepts of constructing interference matrix S, the inventive concept is not limited to the specific example.

Combination of Methods

The three aforementioned methods may be combined in any combination to form interference matrix S in the cancellation of channels from one transmitter. For example, one may form an S matrix composed of all three methods:

$$S=[s1_1{}^0 \, s_b1_2{}^0 \ldots s_p1_{3-5,7,10}{}^0]$$

The first vector uses no information to cancel channel 1, the second vector uses bit information to cancel channel 2 and the last vector uses relative signal amplitude to form a composite interference vector to cancel channels 3–5, 7 and 10.

It should be appreciated that the above-identified specific examples are provided to illustrate the concepts of constructing interference matrix S, the inventive concept is not limited to the specific example.

Multiple Transmitters with No Multipath

Another embodiment of interference matrix S is constructed for the cancellation of multiple transmitters with one or more channels each, where each transmitter and channel is distinguished by a PN code.

No Knowledge

Cancellation of the same channel over a plurality of transmitters without any knowledge of power or bits transmitted is accomplished using the following interference matrix S:

$$S=[s1_2{}^0 \, s2_2{}^0 \, s4_2{}^0]$$

Without loss of generality, s vectors represent LOS interference signal from transmitters one, two and four of channel 2 for each transmitter. The indices may be changed depending on the transmitters and channel to be cancelled.

Cancellation of more than one channel from a plurality of transmitters without any knowledge of power or bits transmitted may be accomplished using the following multi-rank S:

$$S=[s1_1{}^0 \, s2_2{}^0 \, s2_3{}^0 \, s3_1{}^0 \, s3_2{}^0 \ldots s3_n{}^0]$$

Without loss of generality, transmitter three has at least n active channels while transmitters one and two have at least 1 and 3 channels respectively. S is comprised of a subset of these potential interference signals. Interference matrix S may be composed of any number of column vectors less than or equal to the segment length N without departing from the teachings of the present invention.

It should be appreciated that the above-identified specific examples are provided to illustrate the concepts of constructing interference matrix S, the inventive concept is not limited to the specific example.

Knowledge of Bits Transmitted

Another method for constructing single and multi-rank interference matrices S is to use knowledge of the bits transmitted. The construction of interference matrix S is similar to the no knowledge case. Cancellation of the same channel across multiple transmitters with knowledge of the bits transmitted is accomplished using an S, such as the following:

$$S=[s_b1_2{}^0 \, s_b3_2{}^0 \, s_b4_2{}^0]$$

Without loss of generality, s interference vectors represent LOS interference signal for channel 2 from transmitters one, three and four. The indices may be changed according to the transmitters and channel to be cancelled.

Cancellation of more than one channel from multiple transmitters with knowledge of the bits transmitted may be accomplished using the following multi-rank interference matrix S:

$$S=[s_b1_1{}^1 \, s_b2_2{}^1 \, s_b2_3{}^1 \, s_b3_1{}^1 \, s_b3_2{}^1 \ldots s_b3_n{}^1]$$

Without loss of generality, the third transmitter has at least n active channels and the first and second transmitters have at least 1 and 3 channels, respectively. The interference matrix may be composed of any number of column vectors less than or equal to the segment length N without departing from the teachings of the present invention.

It should be appreciated that the above-identified specific examples are provided to illustrate the concepts of constructing interference matrix S, the inventive concept is not limited to the specific example.

Knowledge of Relative Signal Amplitude

Another method for constructing interference matrix S is to use the relative signal amplitudes of the channels. As in the previous methods in this embodiment, it is possible to form an S matrix with one signal vector for each interfering channel or a multi-rank S for a plurality of interfering channels with a signal vector for each channel of each transmitter. However, an advantage of the composite method is that it allows for rank reduction, a reduction in the rank of S while providing cancellation of multiple channels that would normally require a higher rank S.

While the previous methods do not require any knowledge of power, this method requires estimation of the relative signal amplitude of the channels to be cancelled. The simplest embodiment of this method is that of a single rank S that consists of multiple channels from multiple transmitters. Form the following composite vector by summing over the indices j and k and including the corresponding interference vectors to be cancelled. Note that the interfering vectors will only be included for the j and k indices that may have been dynamically selected for inclusion.

$$s_p \sum_j {}_{\Sigma_k}{}^0 = \sum_j \sum_k s_p j_k^0$$

The subscript p denotes that relative signal amplitude is used in constructing the composite interference vector by summing over the channel index and the transmitter index. For the following discussion, vector $s_p$ is defined as an interference vector scaled by its relative amplitude, specifically $s_p = s\theta$ where $\theta$ is the relative amplitude. For example, if the index k ranges over channels 1–3 for transmitter one and channels 3–5 and 7 for transmitter two, the composite vector may be represented as $s_p(\mathbf{1}_{1-3})^0(\mathbf{2}_{3-5,7})^0 = s_p\mathbf{1}_{1-3}{}^0 + s_p\mathbf{2}_{3-5,7}{}^0$. The composite vector effectively contains the information of several interference signals from a plurality of transmitters and channels.

This composite vector may be used in the construction of an interference matrix S that uses knowledge of relative signal amplitude:

$$S=[s_p(1_{1-3})^0(2_{3-5,7})^0]$$

Without loss of generality, this single rank matrix will effectively cancel LOS channels 1–3 of transmitter one and LOS channels 3–5 and 7 of transmitter two.

Additionally, multi-rank interference matrices may be constructed of several composite signals. Without loss of generality, an interference matrix such as the following may be constructed to cancel several channels of multiple transmitters with a plurality of composite signal vectors:

$$S=[s_p 1_{1-4,8}{}^0\ s_p 2_{5,6}{}^0\ s_p(3_{7,9-10,13})^0(4_{1-2})^0]$$

The first signal vector effectively cancels LOS channels 1–4 and 8 of transmitter one; the second vector cancels LOS channels 5 and 6 of transmitter two; and the third vector cancels LOS channels 7, 9–10 and 13 of transmitter three and LOS channels 1–2 of transmitter four.

It should be appreciated that the above-identified specific examples are provided to illustrate the concepts of constructing interference matrix S, the inventive concept is not limited to the specific example.

Combination of Methods

The three aforementioned methods may be combined in any combination to form the interference matrix S for the cancellation of multiple channels and multiple transmitters. For example, one may form an S matrix composed of all three methods:

$$S=[s1_1{}^0\ s2_4{}^0\ s_b 1_2{}^0\ s_b 4_1{}^0 \ldots s_p 7_{1-10}{}^0\ s_p(8_{3-5,7,10})^0(9_{1-3})^0]$$

The first two vectors provides LOS cancellation of channel 1 from transmitter one and channel 4 from transmitter two with no information, the next two vectors provide LOS cancellation of channel 2 from transmitter one and channel 1 from transmitter four using bit information and the last two vectors use relative signal amplitude information to form composite interference vectors to cancel channels 1–10 of transmitter seven and channels 3–5, 7, 10 of transmitter eight and channels 1–3 of transmitter nine.

It should be appreciated that the above-identified specific examples are provided to illustrate the concepts of constructing interference matrix S, the inventive concept is not limited to the specific example.

Single Transmitter with Multipath

Another embodiment of interference matrix S may be constructed for the cancellation of a single channel from a transmitter and its multipath copies. Each channel is distinguished by a PN code for each line-of-sight or multipath signal, but note that PN codes will be shared between each multipath signal. Without loss of generality, the first signal received is referred to as line-of-sight (LOS) and subsequent signals as multipath signals 1, 2, 3, . . . etc.

No Knowledge

Cancellation of one channel for several multipath signals without any knowledge of power or bits transmitted is accomplished using an interference matrix S such as the following:

$$S=[s1_2{}^0\ s1_2{}^1\ s1_2{}^3]$$

Without loss of generality, s vectors represent the interference signal for channel 2 from LOS signal and multipath signals 1 and 3 from transmitter one. The indices may be changed depending on the transmitters and channel to be cancelled.

Cancellation of more than one channel from one transmitter with multipath without knowledge of power or bits transmitted may be accomplished using a multi-rank S, such as the following:

$$S=[s1_1{}^0\ s1_2{}^1\ s1_3{}^1\ s1_1{}^2\ s1_2{}^2\ s1_4{}^2]$$

The interference matrix is composed of LOS of channel 1; first multipath of channels 2 and 3; and second multipath of channels 1, 2 and 4 all of transmitter one. The interference matrix may be composed of any number of column vectors less than or equal to the segment length N without departing from the teachings of the present invention.

It should be appreciated that the above-identified specific examples are provided to illustrate the concepts of constructing interference matrix S, the inventive concept is not limited to the specific example.

Knowledge of Bits Transmitted

Another method for constructing single and multi-rank interference matrices S is to use knowledge of the bits transmitted. Construction of S is similar to the no knowledge case. Cancellation of one channel across multiple transmitters with knowledge of bits transmitted is accomplished using an S such as the following:

$$S=[s_b 1_2{}^0\ s_b 1_2{}^2\ s_b 1_2{}^3]$$

without loss of generality, s vectors represent the interference signals for channel 2 from LOS and multipath signals two and three from transmitter one. The indices may be changed according to the multipath signals and channel to be cancelled.

Cancellation of more than one channel from one transmitter's LOS and multipath signals with knowledge of bits transmitted may be accomplished using a multi-rank S, such as the following:

$$S=[s_b 1_1{}^2\ s_b 1_2{}^1\ s_b 1_1{}^1\ s_b 1_1{}^0\ s_b 1_2{}^0\ s_b 1_3{}^0 \ldots s_b 1_n{}^0]$$

without loss of generality, the transmitter has at least n active channels. Interference matrix S is composed of n channels of LOS signal, channels 1 and 2 of the first multipath and channel 1 of the second multipath. Interference matrix S may, in general, be composed of any number of column vectors less than or equal to the segment length N without departing from the teachings of the present invention.

It should be appreciated that the above-identified specific examples are provided to illustrate the concepts of constructing interference matrix S, the inventive concept is not limited to the specific example.

Knowledge of Relative Signal Amplitude

Another method for constructing interference matrix S is to use the relative signal amplitudes of each of the channels. As in the previous methods in this embodiment it is possible to form interference matrix S with one signal vector for each channel's LOS or multipath signal for a particular transmitter. An advantage of the composite method is that it allows for rank reduction, a reduction in the rank of interference matrix S while still providing cancellation of multiple channels.

While the previous methods do not require any knowledge of power, this method requires estimation of the relative signal amplitude of the channels to be cancelled. The simplest embodiment is that of a single rank S that consists of multiple LOS and multipath channels from one transmitter. Form the composite interference vector:

$$s_p 1_{\Sigma_k}^{\Sigma_j} = \sum_j \sum_k s_p 1_k^j$$

where subscript p denotes that relative signal amplitude is used in constructing the interference vector by summing over channel index (k) and multipath index (j) and including the corresponding interference vectors to be cancelled. Note that the interfering vectors will only be included for the j and k indices that may have been dynamically selected for inclusion. For the following discussion, vector $s_p$ is defined as the interference vector scaled by the amplitude, specifically $s_p = s\theta$. For example, if the index k ranges from channels 1–3 for LOS signal and channels 3–5 and 7 for first multipath signal, the composite vector may be represented as $s_p(1_{1-3})^0(1_{3-5,7})^1 = s_p 1_{1-3}{}^0 + s_p 1_{3-5,7}{}^1$. The composite vector effectively contains the information of several interference signals from one transmitter's LOS and multipath signals for multiple channels.

This composite vector may be used in the construction of an interference matrix S that uses knowledge of relative signal amplitude:

$$S = [s_p(1_{1-3})^0(1_{3-5,7})^{1,3}]$$

Without loss of generality, this single rank matrix will effectively cancel channels 1–3 of LOS signal and channels 3–5 and 7 of the first and third multipath signals.

Additionally, multi-rank interference matrices may be constructed of several composite signals. Without loss of generality, the following interference matrix may be constructed to cancel several channels of several multipath signals with a plurality of composite signal vectors:

$$S = [s_p 1_{1-4,8}{}^{0,1}\ s_p 1_{5,6}{}^1\ s_p(1_{7,9-10,13})^2 (1_{1-2})^3]$$

The first signal vector effectively cancels channels 1–4 and 8 of LOS signal and first multipath; the second vector cancels channels 5 and 6 of the first multipath; and the third vector cancels channels 7, 9–10 and 13 of multipath two and channels 1–2 of multipath three.

It should be appreciated that the above-identified specific examples are provided to illustrate the concepts of constructing interference matrix S; the inventive concept is not limited to the specific example.

Combination of Methods

The three aforementioned methods may be combined in any combination to form interference matrix S in the cancellation of the channels of one transmitter and its multipath copies. For example, one may form an S matrix composed of all three methods:

$$S = [s1_1{}^0\ s1_4{}^1\ s_b 1_2{}^0\ s_b 1_1{}^3 \ldots s_p 1_{1-10}{}^6\ s_p(1_{3-5,7,10})^7 (1_{1-3})^8]$$

The first two vectors use no knowledge to cancel LOS signal of channel 1 from transmitter one and the first multipath of channel 4 from transmitter one; the next two vectors use bit information to cancel LOS signal of channel 2 from transmitter one and the third multipath of channel 1 from transmitter one; and the last two vectors use relative signal amplitude information to form composite interference vectors for the sixth multipath of channels 1–10 of transmitter one and channels 3–5, 7 and 10 of multipath seven and channels 1–3 of multipath eight from transmitter one.

It should be appreciated that the above-identified specific examples are provided to illustrate the concepts of constructing interference matrix S; the inventive concept is not limited to the specific example.

Multiple Transmitters with Multipath

Another embodiment of interference matrix S is constructed for the cancellation of a plurality of transmitters and their multipath signals with one or more channels each. Each channel is distinguished by a PN code for each line-of-sight or multipath signal, but note that PN codes will be shared between the transmitter's LOS and multipath signals and that relative power will be consistent between the channels in each multipath signal from the same transmitter. Without loss of generality, the first signal is referred to as line-of-sight (LOS) and subsequent signals as multipath signals one, two, three, . . . etc.

No Knowledge

Cancellation of one channel for a plurality of multipath signals and a plurality of transmitters without any knowledge of power or bits transmitted is accomplished using an interference matrix S such as the following:

$$S = [s1_2{}^0\ s1_2{}^1\ s1_2{}^3\ s2_2{}^0\ s2_2{}^1\ s3_2{}^0\ s4_2{}^0]$$

Without loss of generality, s vectors represent the interference signals corresponding to channel 2 from LOS and multipath signals one and three from transmitter one, LOS and multipath signal one from transmitter two and LOS signal from transmitters three and four. The indices may be changed depending on the transmitters and channel to be cancelled.

Cancellation of more than one channel from a plurality of transmitters with a plurality of multipath signals without any knowledge of power or bits transmitted may be accomplished using a multi-rank interference matrix S, such as:

$$S = [s1_1{}^0\ s1_2{}^1\ s1_3{}^1\ s1_1{}^2\ s2_1{}^0\ s2_2{}^0\ s2_1{}^2\ s3_1{}^0\ s3_1{}^1\ s4_1{}^1]$$

without loss of generality, interference matrix S is composed of signals from multiple transmitters: channel 1 of LOS signal, channels 2 and 3 from the first multipath signal, and channel 1 of the second multipath for transmitter one; channel 1 and 2 of LOS signal and channel 1 of the second multipath for transmitter two; channel 1 of LOS and first multipath signal for transmitter three; and channel 4 of the first multipath for transmitter four. Interference matrix S may be composed of any number of column vectors less than or equal to the segment length N without departing from the teachings of the present invention.

It should be appreciated that the above-identified specific examples are provided to illustrate the concepts of constructing interference matrix S, the inventive concept is not limited to the specific example.

Knowledge of Bits Transmitted

Another method for constructing single and multi-rank interference matrices S is to use knowledge of the bits transmitted. The construction of interference matrix S is similar to the no knowledge case. Cancellation of the same channel across multiple transmitters with multipath and knowledge of the bits transmitted is accomplished using an S such as the following:

$$S = [s_b 1_2{}^0\ s_b 1_2{}^2\ s_b 2_2{}^0\ s_b 3_2{}^2\ s_b 5_2{}^2\ s_b 7_2{}^3]$$

without loss of generality, s interference vectors represent the interference signals for channel two from LOS and multipath signals of multiple transmitters. The signals include LOS and the second multipath signal for transmitter one, LOS signal from transmitter two, the second multipath from transmitter three, the second multipath from transmitter five and the third multipath from transmitter seven. The indices may be changed according to the transmitters, channels and multipath signals to be cancelled.

An example of cancellation of more than one channel from multiple transmitters' LOS and multipath signals with knowledge of bits transmitted may be accomplished using a multi-rank S, such as the following:

$$S=[s_b 1_1{}^2 \; s_b 1_2{}^1 \; s_b 2_1{}^1 \; s_b 3_1{}^2 \; s_b 3_2{}^3 \; s_b 4_3{}^0 \; s_b 5_3{}^3 \; s_b 6_{10}{}^1]$$

Interference matrix S is composed of channel 1 of the second multipath and channel 2 of the first multipath for transmitter one; channel 1 of the first multipath for transmitter two; channel 1 of the second multipath and channel 2 of the third multipath for transmitter three; channel 3 of LOS for transmitter 4; channel 3 of the third multipath for transmitter 5; and channel 10 of the first multipath for transmitter 6. The interference matrix may, in general, be composed of any number of column vectors less than or equal to the segment length N without departing from the teachings of the present invention.

It should be appreciated that the above-identified specific examples are provided to illustrate the concepts of constructing interference matrix S, the inventive concept is not limited to the specific example.

Knowledge of Relative Signal Amplitude

Another method for constructing interference matrix S is to use the relative signal amplitudes of each of the channels. As in the previous methods in this embodiment, it is possible to form an S matrix with one signal vector for each channel's LOS or multipath signal. Note that the relative signal amplitude between a transmitter's channels will be consistent between the channels for each multipath signal. An advantage of using relative signal amplitude is that the composite method allows for rank reduction, a reduction in the rank of S while providing cancellation of multiple channels equivalent to a higher rank matrix using previous methods.

While the previous methods do not require any knowledge of power, this method requires estimation of the relative signal amplitude of the channels to be cancelled. The simplest embodiment is that of a single rank S that consists of multiple LOS and multipath channels from multiple transmitters. Form the composite vector:

$$s_p \sum_j {}^{\Sigma m}_{\Sigma k} = \sum_j \sum_k \sum_m s_p j_k^m$$

where the subscript p denotes that relative signal amplitude is used in constructing the composite interference vector by summing over channel index (k), multipath index (m) and transmitter index (j) and including the corresponding interference vectors to be cancelled. Note that interference vectors will only be included for the j, k and m indices selected for inclusion. For the following discussion, vector $s_p$ is defined as the interference vector scaled by its relative amplitude, specifically $s_p = s\theta$ where $\theta$ is the relative amplitude. For example, if index k ranges from channels 1–3 for LOS signal and first multipath for transmitter one; channels 2–10 for multipath three from transmitter one; and channels 3–5 and 7 for multipath signal one for transmitter two, the composite vector may be represented as $s_p(1_{1-3})^{0,1}(1_{2-10})^3$ $(2_{3-5,7})^1 = s_p 1_{1-3}{}^{0,1} + s_p 1_{2-10}{}^3 + s_p 2_{3-5,7}{}^1$. The composite vector effectively contains the information of several interference signals from a plurality of transmitter's LOS and multipath signals for a plurality of channels.

This composite vector may be used in the construction of an interference matrix S that uses knowledge of relative power, such as:

$$S=[s_p(1_{1-3})^{0,1}(2_{3-5,7})^4(3_{2,13-15})^3]$$

Without loss of generality, this single rank matrix will effectively cancel channels 1–3 of LOS signal and first multipath for transmitter one; channels 3–5 and 7 of the fourth multipath signal for transmitter two; and channels 2, 13–15 of the third multipath signal for transmitter three.

Additionally, multi-rank interference matrices may be constructed of several composite signals. Without loss of generality, the following interference matrix S may be constructed to cancel a plurality of channels and multipath signals with a plurality of composite signal vectors:

$$S=[s_p 3_{1-4,8}{}^0 \; s_p 1_{5,6}{}^{1,3} \; s_p(1_{7,9-10,13})^2 (2_{1-2})^3 \; s_p(5_{3-18})^4 \\ (4_{1-2})^5]$$

The first signal vector effectively cancels channels 1–4 and 8 of LOS signal for transmitter three; the second vector cancels channels 5 and 6 of the first and third multipath for transmitter one; the third vector cancels channels 7, 9–10 and 13 of the second multipath for transmitter one and channels 1–2 of the third multipath for transmitter two; and the fourth vector cancels channels 3–18 of the fourth multipath for transmitter five and channels 1–2 of the fifth multipath for transmitter four.

It should be appreciated that the above-identified specific examples are provided to illustrate the concepts of constructing interference matrix S, the inventive concept is not limited to the specific example.

Combination of Methods

The three aforementioned methods may be combined in any combination to form interference matrix S in the cancellation of the channels of multiple transmitters and their multipath. For example, one may form an S matrix composed of all three methods:

$$S=[s1_1{}^0 \; s2_4{}^1 \; s_b 4_2{}^0 \; s_b 3_3{}^3 \ldots s_p 5_{1-10}{}^6 \; s_p(7_{3-5,7,10})^{7,8} \\ (8_{1-3})^8]$$

The first two vectors use no information of bits or power to cancel LOS signal from channel 1 of transmitter one and the first multipath of channel 4 from transmitter two; the next two vectors use bit information to cancel LOS signal of channel 2 from transmitter 4 and the third multipath signal of channel 3 from transmitter three; and the last two vectors use relative signal amplitude information to cancel the sixth multipath of channels 1–10 from transmitter five and the seventh and eighth multipath of channels 3–5, 7, 10 of transmitter seven and the eighth multipath of channels 1–3 for transmitter eight.

It should be appreciated that the above-identified specific examples are provided to illustrate the concepts of constructing interference matrix S, the inventive concept is not limited to the specific example.

General CSPE Receiver Architecture

Figure 5:
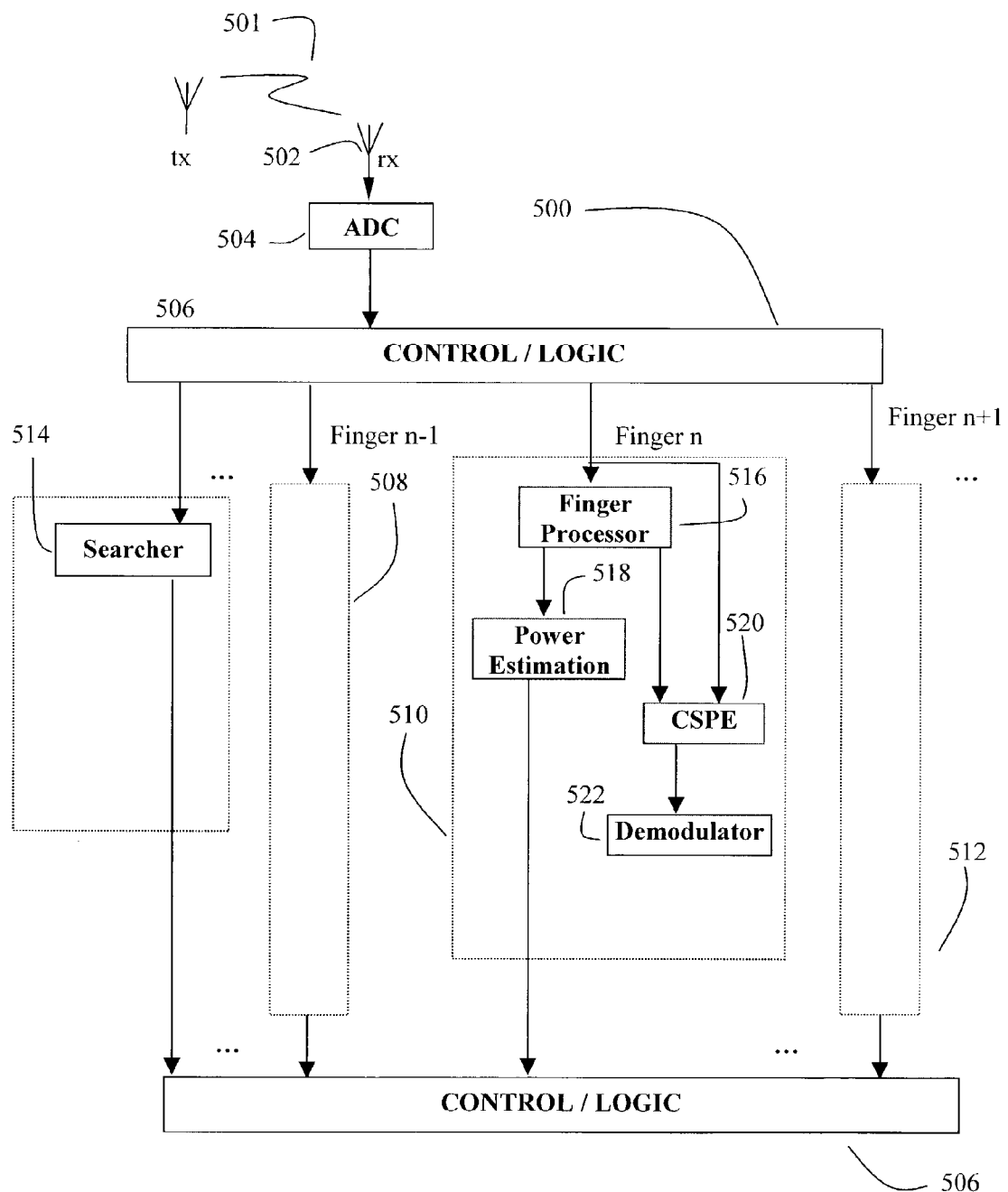
FIG. 5 is a depiction of the general, CSPE-enabled receiver constructed in accordance with a preferred embodiment of the invention.

FIG. 5 provides a generalized CSPE receiver architecture 500. The generation of interference matrix S is conducted in CSPE module 520. Transmitted signal 501 is received by antenna 502 and frequency down-converted and sampled in ADC box 504. Control/logic module 506, depicted as two modules to simplify the connections and for clarity, provides appropriate information to the assignment of fingers 508, 510 and 512 and data flow to and from fingers 508, 510 and 512. For a detailed discussion of control/logic module 506, the reader is referred to U.S. Provisional Patent Application No. 60/412,550, entitled "A Controller for Interference Cancellation in Spread Spectrum Systems," filed Sep. 23, 2002, and hereby incorporated in its entirety by reference. Searcher module 514 continually searches for signals to acquire. Fingers 508, 510, 512 are preferably identical, arbitrary fingers in the receiver. It should be appreciated that these fingers 508, 510, and 512 are illustrative and only the interactive elements in each finger are illustrated. Preferably, each finger has the structure that is illustrated in exemplary finger 510. A finger processor 516 is what is typically contained in finger 510 of a baseline receiver. It may perform acquisition depending on the receiver architecture and tracks the assigned signal of interest. Power estimation module 518 does power estimation that is used by control/logic module 506 to manage finger assignment, Coded Signal Processing Engine (CSPE) 520 performs the projection operation to remove interference and demodulator 522 demodulates the signal of interest. For a detailed discussion of power estimation module 518, the reader is referred to U.S. Provisional Patent Application No. 60/418,187, entitled "Method for Channel Amplitude Estimation and Interference Vector Construction," filed Oct. 15, 2002, which is hereby incorporated by reference in its entirety. The projection operator or the data that has been operated on by the projection operator is sent to control logic module 506 and may be used by subsequent fingers to perform acquisition and/or tracking of signals with the benefit of interference cancellation. As discussed above, both control/logic modules 506 are preferably the same module and are illustrated as separate items for clarity. For a detailed discussion of receiver architectures, the reader is referred to U.S. Provisional Patent Application No. 60/354,093, entitled "A Parallel CPSE Based Receiver for Communication Signal Processing," filed Feb. 5, 2002; U.S. patent application Ser. No. 10/247,836, entitled "Serial Cancellation Receiver Design for a Coded Signal Processing Engine," filed Sep. 20, 2002; and U.S. Provisional Patent Application No. 60/348,106, entitled "Serial Receiver Design for a Coded Signal Processing Engine," filed Jan. 14, 2002; which are hereby incorporated in their entirety by reference hereto.

Correlation Length Issues

Interference signal vectors used in the construction of interference matrix S may, in general, be of an arbitrary segment length N. If the correlation length spans no more than one modulated symbol there is no sign ambiguity and the discussed embodiments hold true. However, if the correlation length spans more than one modulated symbol, there is a sign ambiguity existing between the modulated symbols within the segment. The projection operation, in the context of the CSPE, effectively projects a signal on a subspace orthogonal to an interference subspace that is in the direction of both the interference signal vector and its negative (anti-parallel direction). If the interference vector is composed of more than one modulated symbol then there are more than the two possible directions, i.e., the vector and the negative of the vector. Namely, portions of the vector may change sign, thereby changing the direction of the vector by some amount other than 180 degrees.

For example, an interference vector consisting of two symbols has four possible directions and, in general, a vector containing n modulated symbols may point in $2^n$ different directions, depending on the sign of each modulated symbol.

Therefore, interference subspace cancellation, without information regarding the bits transmitted or the transmitted relative amplitude is not possible in general, when the correlation length spans more than one modulated symbol, since there are multiple possible interference subspaces. FIG. 6 depicts interference signals based on one modulated symbol and multiple modulated symbols.

Figure 6A:
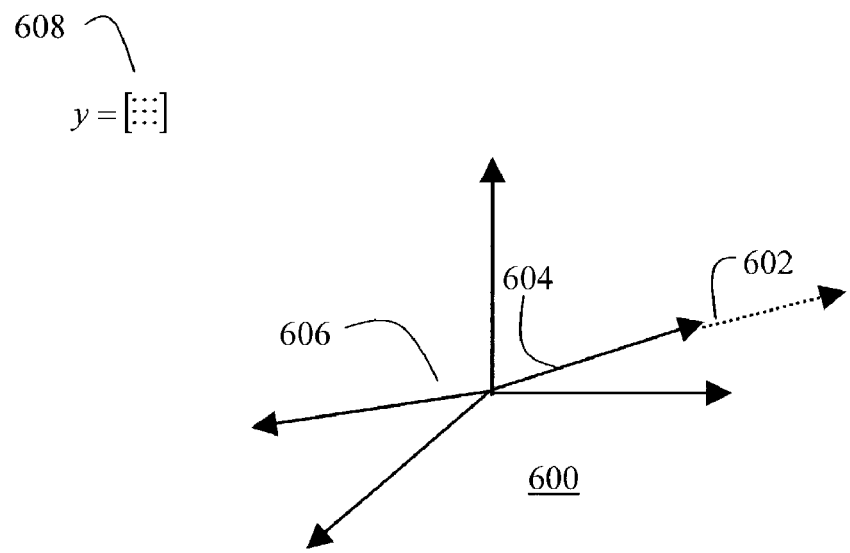
FIGS. 6a and 6b are depictions of issues concerning the use of a correlation length that includes multiple modulated signals.

In FIG. 6a, element 600 depicts an arbitrary n-dimensional space with a single modulated symbol vector 602 corresponding to the direction of the projection operator based on a positive modulated symbol in the interference vector. The two possibilities for the true interference vector are 604 and 606, vectors representing a positive and a negative modulated symbol, respectively. Thus, with no information regarding the bit transmitted or relative signal amplitude it is possible to remove an interference signal vector by constructing a projection operator based upon the positive symbol. Element 608 illustrates that the correlation length spans no more than one modulated symbol.

Figure 6B:
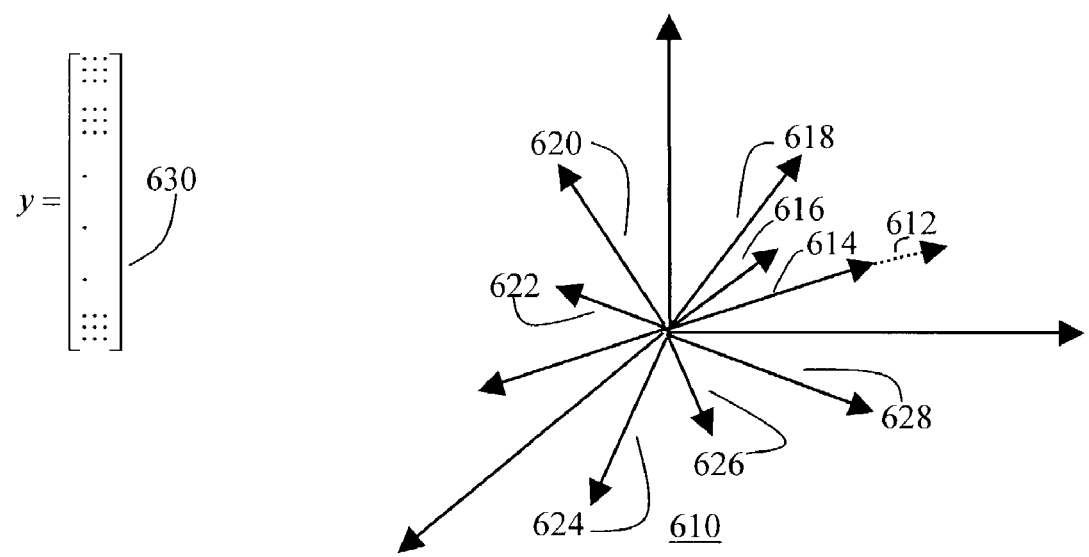

In FIG. 6b, element 610 depicts an arbitrary n-dimensional space with a multiple modulated symbol vector 612 corresponding to the direction of the projection operator based on all positive modulated symbols in the interference vector. The multiple possibilities for the true interference vector include vectors 614, 616, 618, 620, 622, 624, 626 and 628, which represent different combinations of positive and negative modulated symbols comprising the interference vector. Thus, with no information regarding bits transmitted or relative signal amplitude it is not possible to correctly remove the interference signal vector by constructing a projection operator based upon all positive symbols. Therefore, it is necessary to have either bit information or relative signal amplitude information, both of which provide the appropriate sign for each of the modulated symbols contained in the interference vector in order to cancel across symbol boundaries. Element 630 illustrates that the correlation length spans more than one modulated symbol.

Knowing either the bits transmitted (sign of the signal) or the relative signal amplitude of the transmitted signals specifies the interference subspace. The previously discussed embodiments will then hold true with the exception of the no information case.

Estimation of Bits Transmitted

Some embodiments of the invention depend on estimation of the sign of the symbols (bits) transmitted in order to construct an interference matrix S. Correlating the real symbol in the data with a corresponding real reference signal provides an estimate of the bits transmitted. After correlation of the two symbol length vectors, a binary decision is made as to whether the symbol was sent or its inverse (negative). The correlation is performed with a real reference signal in order to determine the symbol sign. Namely, zero is the threshold: if the result is positive, then the symbol used for the reference signal was transmitted, otherwise if the result is negative, the inverse of the symbol was transmitted. This estimate is used in the construction of the corresponding interference vector. Depending on the sign decision, either the symbol used in the correlation is used in the construction of the interference matrix or its inverse. It is possible that channels may be inactive. It may be useful to set a threshold, such that below a particular threshold the channel will be ignored and considered inactive. For example, in IS-95 inactive traffic channels may be ignored by setting the threshold equal to the amplitude of the synchronization channel, which may be the weakest active channel, and only including channels whose amplitude is greater than the threshold.

Figure 7:
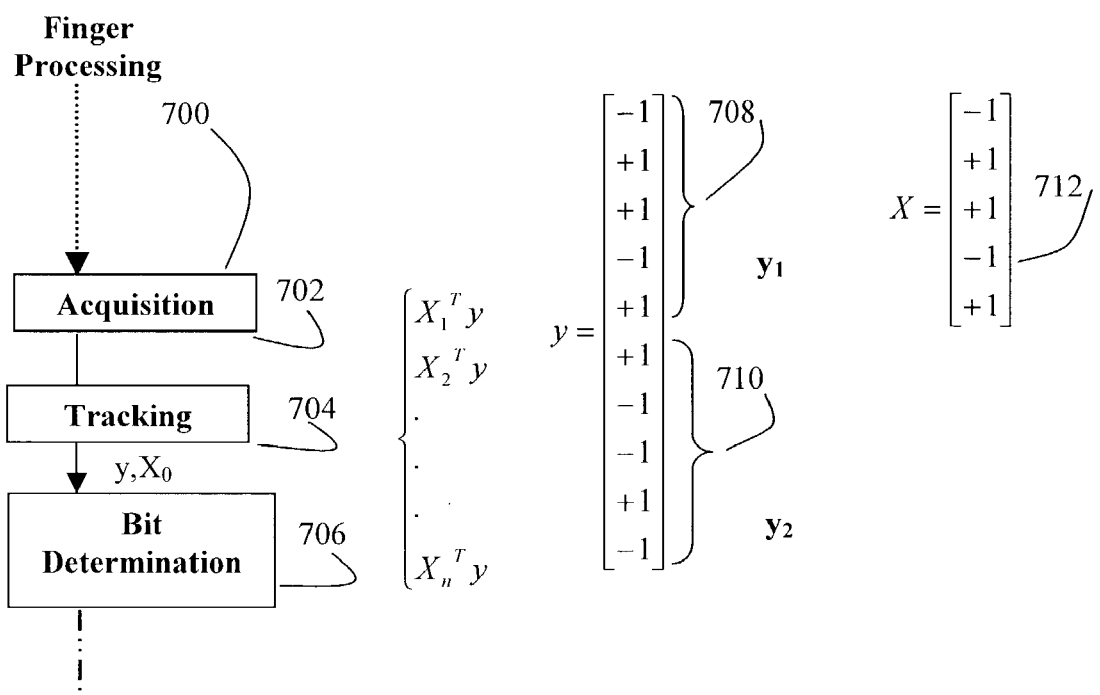
FIG. 7 is a depiction of the sign determination module for determining the sign of modulated symbols that is constructed in accordance with a preferred embodiment of the invention.

FIG. 7 illustrates the location of bit determination module 706 and process flow 700 associated therewith. After an acquisition module 702 and tracking module 704, the data y and a reference signal $x_0$ are passed to bit determination module 706. In bit determination module 706, the data is correlated with all codes used for channelization. For example, in cdmaOne the data and pilot reference signal (Walsh code 0) is passed to bit determination module 706 and the data is correlated with the 63 other Walsh codes. Since IS-95 Walsh codes are based upon a rank 64 Hadamard matrix it is possible to use a Fast Hadamard Transform (FHT) module to perform the correlation. In order to deal with the supplementary channels in cdma2000 a Fast Walsh Transform (FWT) may be used as well. A base-band example (zero carrier frequency) illustrates how the bit determination is performed. The data vector contains two consecutive modulated symbols, 708 and 710, where the brackets denote the symbol boundaries. The vector is correlated symbol by symbol with a reference signal 712. The correlation does not require normalization since a threshold decision is made about zero. However, if there is a bias in the signal the threshold may be displaced from zero. The correlation of modulated symbol 708 and reference signal 712 provides a positive result, implying that the symbol used in constructing reference signal 712 was transmitted (positive). In the present example, the correlation of $y_1$ with X, $(-1)(-1)+(1)(1)+(1)(1)+(-1)(-1)+(1)(1)$, would yield a value of positive 5. The correlation of modulated symbol 710 and reference symbol 712 provides a negative result, implying that the inverse of the symbol used in constructing reference symbol 712 was transmitted (negative). In the present example, the correlation of $y_2$ with X, $(-1)(1)+(1)(-1)+(1)(-1)+(-1)(1)+(1)(-1)$, would yield a value of negative 5. It should be appreciated that the above-identified specific examples are provided to illustrate the concept of estimating the sign of bits transmitted; the inventive concept is not limited to the specific example.

Estimation of Relative Amplitude

Some embodiments of the invention depend on estimation of the relative signal amplitude of the symbols transmitted in order to construct an interference matrix S, particularly the composite method. The methodology is similar to how the estimation of bits transmitted is performed. Correlating the real symbol in the data with a corresponding real reference signal provides an estimate of the relative amplitude of transmission. The correlation is performed with real vectors since it is important to capture the sign of the correlation, which corresponds to the sign of the symbol, along with the amplitude. It is possible that channels may be inactive. It may be useful to set a threshold, such that below a particular threshold the channel will be ignored. For example, in IS-95 inactive traffic channels may be ignored by setting the threshold as the power of the synchronization channel, which is typically the weakest active channel.

Figure 8:
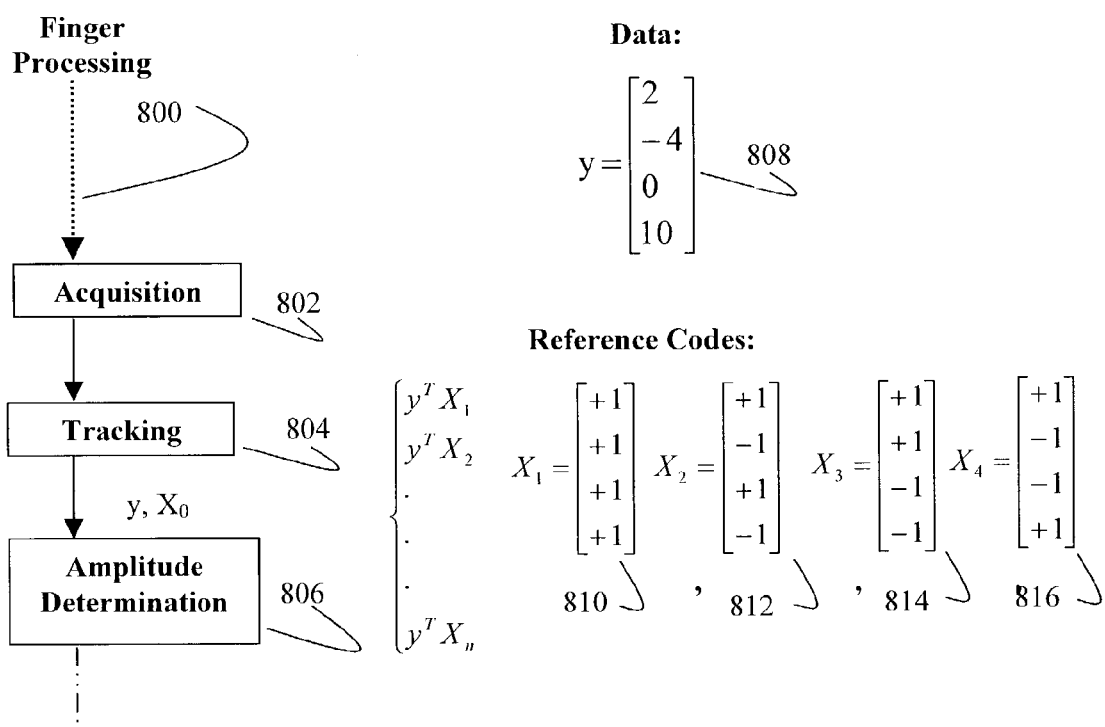
FIG. 8 is a depiction of the signal amplitude determination module for determining the relative amplitude of modulated symbols that is constructed in accordance with a preferred embodiment of the invention.

FIG. 8 illustrates the location of bit determination module 806 and process flow 800 associated therewith. This process is similar to process 700. Acquisition module 802 and tracking module 804 provide the data vector y and reference vector $x_0$ to amplitude determination module 806. In module 806 the data is correlated with each of the codes used for channelization and is normalized according to the length of the vectors. For example, in CDMAOne the data is correlated with the other 63 Walsh codes. Since IS-95 Walsh codes are based upon a rank 64 Hadamard matrix it is possible to use a Fast Hadamard Transform (FHT) module to perform the correlation. Vectors 808, 810, 812, 814 and 816 provide a simple base-band example of signal amplitude determination. Data vector 808 is correlated with 4 reference codes 810, 812, 814 and 816 and normalized. For example, $y^T X_1 = \frac{1}{4}[(2)(1)+(-4)(-1)+(0)(1)+(10)(1)]$; $y^T X_2 = \frac{1}{4}[(2)(1)+(-4)(-1)+(0)(1)+(10)(-1)]$; $y^T X_3 = \frac{1}{4}[(2)(1)+(-4)(1)+(0)(-1)+(10)(-1)]$; and $y^T X_4 = \frac{1}{4}[(2)(1)+(-4)(-1)+(0)(-1)+(10)(1)]$. The normalized correlations provide the results 2, −1, −3 and 4, respectively. If these interference vectors are used to construct a composite interference vector, vectors 810, 812, 814 and 816 should be scaled by the results of the correlation prior to summing. Thus, vector 810 is multiplied by 2, vector 812 is multiplied by −1, vector 814 is multiplied by −3 and vector 816 is multiplied by 4. It should be appreciated that the above-identified specific examples are provided to illustrate the concept of estimating the amplitude of bits transmitted; the inventive concept is not limited to the specific example.

Misalignment Issues

Knowledge of either the bits transmitted or the relative amplitude of the signals transmitted allows much greater flexibility in terms of cancellation as previously discussed. However, this induces some dependencies in terms of timing when performing the cancellation operation on signals whose symbol boundaries do not align. In effect, this induces a timing delay between the processing of signals in the order of the cancellation of signals.

Figure 9:
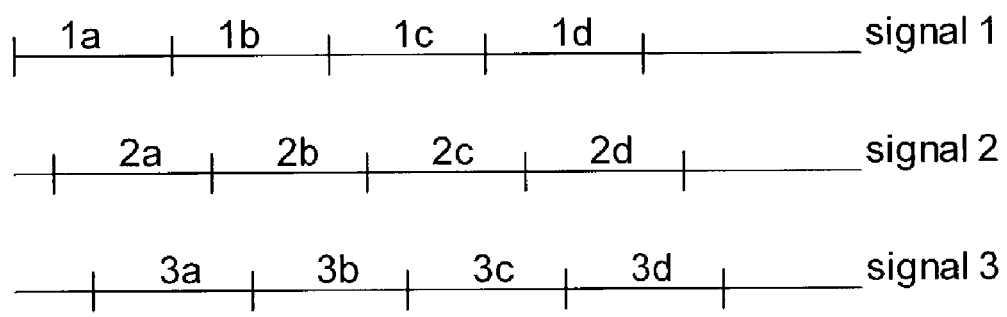
FIG. 9 is a depiction of symbol misalignment and its implication on signal cancellation associated with the present invention.

FIG. 9 shows that in order to cancel signal 1 from segment 2a, reference signals need to be generated for 1a and 1b. Furthermore, in order to cancel signals 1 and 2 from segment 3a, reference signals for 1a, 1b, 1c, 2a and 2b need to be generated. This cascading effect leads to inherent timing delay due to symbol misalignment.

A serial approach for cancellation of multiple signals from the received data may be performed by successively canceling signals from the data in a cascading manner. Thus, signal 1 is cancelled from the data y, producing $y^{(1)}$, in order to facilitate the detection of signal 2 where the superscript denotes the number of signals canceled. Similarly, signal 2 may be cancelled from $y^{(1)}$ yielding $y^{(2)}$, allowing for the detection of an even weaker signal 3. For every signal cancellation, the minimum delay between the strongest signal and the weakest is increased by at minimum one correlation length.

Another approach to the cancellation of multiple signals is to "back-calculate" the reference signals, thereby augmenting interference matrix S and performing parallel cancellation. Rather than cancellation in a serial manner, all projection operators thereby operate on the received data y in a parallel sense. However, for each additional cancellation another interference vector is added to interference matrix S. Cancellation of the first base station proceeds in the same manner as described in the serial cancellation method described above. The additional cancellations are performed in a slightly different manner than the serial cancellation method. Rather than canceling the second signal from $y^{(1)}$ the interference reference signal is used in conjunction with the interference reference signal used to create $y^{(1)}$ to form a higher rank interference matrix. Namely, the interference matrix for the first projection operator is of rank 1, the second projection operator is of rank 2, etc. Every cancellation operation is performed on the original y data vector. Note that this method still induces a delay for every signal cancelled.

EXAMPLE 1

This example is of a telecommunications embodiment of the construction of the S matrix and issues involved with the formation of S. These issues are discussed in detail in the following sub-sections.

In the case of wireless communication in the forward link, it is assumed that the mobile does not have any prior knowledge about which channels are active other than the pilot, paging and synchronization channels. Moreover, it does not have any prior knowledge of the relative powers of the various channels including the traffic channels. Specifically in CDMAOne (see IS-95), one could cancel all 64 channels (for complete cancellation of a base station) or a subset of the channels at the appropriate code, Doppler and phase offsets estimated from the pilot channel. The following discussion pertains directly to IS-95, but with some changes, e.g., the addition of QOF codes, supplementary channels and QPSK modulation, it would be possible to easily extend this telecommunications embodiment to cdma2000 and is contemplated within the scope of the present invention.

No Prior Knowledge:

Recall that all the channels in the forward link are perfectly synchronized with the pilot channel in each finger. In order to entirely cancel each base station, all active channels must be cancelled in each LOS and multipath signal. The most straightforward approach to canceling the interference of one base station is to cancel all 64 channels from each signal corresponding to the same source. Under this scheme, for each multipath of the base station one wishes to cancel, the matrix S would be augmented with an additional 64 columns. However, one could also cancel a subset of the channels of one base station and its multipath signals to simplify the computational complexity and exploit the number of inactive channels and channels transmitting at low power relative to the threshold. Similarly, for each base-station and its multipath signals, we could continue to augment the S matrix with interference column vectors. Under the cdma2000 standards, one would also have to include the Quasi Orthogonal Function (QOF) codes, longer Walsh codes, supplementary channels (short Walsh codes) and QPSK modulation for the additional forward link channels. However, all of this is predicated on the correct alignment of the modulated symbols (Walsh symbols boundaries) in the received data.

Pilot only cancellation does not require symbol alignment, but the issue has relevance for all other cancellation methods. Pilot-only cancellation may be performed over arbitrary correlation lengths with no bit or relative amplitude information since there is no information transmitted on the pilot channel and thus no possibility of sign changes between consecutive symbols. Moreover, the pilot channel only cancellation methods have no limitation on correlation length. With misalignment, all the other methods require that cancellation occur on the scale of a Walsh symbol unless sign information or relative amplitude is used, thus the corresponding interference vector may only contain one Walsh symbol. Therefore, the methods that involve cancellation of more than just the pilot channel are limited to only one Walsh symbol for cancellation purposes.

Pilot Only

Pilot only cancellation is accomplished by generating an interference reference vector s or matrix S consisting solely of pilot channel(s). In its simplest form, this consists of one pilot signal from one base station in the interference matrix S. The interference matrix may also include pilot signals from other base stations in the form of additional column vectors. The total number of pilot signals to be cancelled determines the rank of the interference matrix S.

For example, a rank 1 pilot only cancellation matrix is a [N×1] vector containing one pilot signal. A multi-rank pilot only S matrix contains a pilot channel from a different base stations or multipath in each column. The following equation describes the structure of a rank M pilot only S matrix for M base stations. Note that the pilot channel is channel zero.

$$S=[s1_0^0\ s2_0^0\ \ldots\ sM_0^0]$$

This method requires no knowledge of the power of the pilot signals to be cancelled, of knowledge of the bits transmitted, symbol boundaries or limitations to the interference vector length.

It should be appreciated that the above-identified specific examples are provided to illustrate the concepts of constructing the interference matrix S, the inventive concept is not limited to the specific example.

Pilot only with Multipath

Pilot only cancellation may consist of either one base station or a plurality of base stations. Additionally, pilot only cancellation may include the multipath signals from one base station or a plurality of base stations. Without loss of generality, the following S matrix structure depicts an example of pilot only cancellation with multipath. This method does not have any limitations in terms of the length of the interference vectors.

$$S=[s1_0^0\ s1_0^1\ s2_0^0\ s2_0^1\ s2_0^2\ \ldots\ sM_0^3]$$

It should be appreciated that the above-identified specific examples are provided to illustrate the concepts of constructing the interference matrix S, the inventive concept is not limited to the specific example.

Pilot and Paging

The pilot channel is typically the highest power channel for a given base station and is the obvious channel to cancel for maximum interference cancellation with minimal complexity. The rank of the S matrix is the primary determining factor in the computational requirements of the interference cancellation operation. For an increase in complexity and an increase in the amount of interference to cancel, one may cancel additional channels within the signal. The obvious choice after the pilot channel for cancellation is the paging channel since it is often the next strongest in terms of power followed in power by the traffic channels. The synchronization channel is a low data rate channel operating at a low power and may be lower in power than the active traffic channels. However, in scenarios of mobile units of varying distance from the base station the synchronization channel may be greater than the active channel.

The S matrix may be constructed of pilot and paging channels from an arbitrary number of base stations as long as the matrix includes only one Walsh symbol per interference vector. In practice, due to the alignment constraint, the cancellation matrix will typically include channels from only one finger. The following is a simple example of an S matrix for pilot and paging.

$$S=[s1_0^0\ s1_1^0]$$

This example consists of the pilot and paging channels from a single finger from one base station.

It should be appreciated that the above-identified specific examples are provided to illustrate the concepts of constructing the interference matrix S, the inventive concept is not limited to the specific example.

Other Multi-Rank

The choice of channels to cancel depends on the requirements of the communication device/system, but would likely consist of the highest relative amplitude channels since they comprise the majority of the interference in detecting other base stations. After pilot and paging, more complete cancellation may be achieved with other multi-rank methods that include a greater number of channels. The greatest amount of additional cancellation with the smallest marginal computational cost is cancellation of pilot, paging and the strongest traffic channels. The previously discussed signal amplitude determination modules may provide an estimate of the strongest traffic channels to allow for a ranking of the strongest channels. A threshold may be chosen, such that all traffic channels above the threshold are included in the construction of interference matrix S or instead a pre-determined number of traffic channels may be included in the construction of interference matrix S.

The S matrix may be constructed of pilot, paging, traffic and other channels from an arbitrary number of base stations. The following is a simple example of an S matrix for multi-rank cancellation.

$$S=[s1_0^0\ s1_1^0\ s1_5^0\ s1_{10}^0\ s1_{15}^0\ s1_{42}^0]$$

This example consists of the pilot, paging and traffic channels from one base station.

It should be appreciated that the above-identified specific examples are provided to illustrate the concepts of constructing the interference matrix S, the inventive concept is not limited to the specific example.

Full Rank

Full rank cancellation is computationally expensive, but provides virtually complete interference cancellation of all of one base station's channels without requiring knowledge of relative or absolute power. CdmaOne specifies 64 channels per base station including pilot, paging, synchronization and traffic, so the full rank cancellation procedure is of rank 64. In cdma2000 the number of channels greatly increases, including longer Walsh codes, supplementary Walsh codes and QOFs, so the rank may be much larger.

In cdmaOne the S matrix is constructed of all 64 channels. Without loss of generality, consider the cancellation of the LOS signal from base station one.

$$S=[s1_0^0\ s1_1^0\ s1_2^0\ s1_3^0\ \ldots\ s1_{63}^0]$$

This S matrix may be augmented to include additional multipath signals or base stations. As previously noted, the number of interference vectors cannot exceed the rank of the matrix, i.e., the number of channels cannot exceed the segment length N.

It should be appreciated that the above-identified specific examples are provided to illustrate the concepts of constructing the interference matrix S, the inventive concept is not limited to the specific example.

Knowledge of Bits Transmitted:

Using knowledge of bits transmitted increases the number of cancellation methods available that are not affected by symbol misalignment. Methods of cancellation include multi-rank cancellation of pilot and paging (typically the two strongest power channels), pilot and paging plus a subset of the strongest traffic channels and all channels (full rank).

Pilot and Paging

The pilot channel is typically the highest power channel for a given base station and is the obvious channel to cancel for maximum interference cancellation with minimal complexity. The rank of the S matrix is the primary determining factor in the computational requirements of the interference cancellation operation. For an increase in complexity and an increase in the amount of interference to cancel, one may cancel additional channels within the signal. The obvious choice after the pilot channel for cancellation is the paging channel since it is often the next strongest in terms of power followed in power by the traffic channels. The synchronization channel is a low data rate channel operating at a low power and may be lower in power than the active traffic channels. However, in scenarios of mobile units of varying distance from the base station the synchronization channel may be greater than the active channels.

The S matrix may be constructed of pilot and paging channels from an arbitrary number of base stations. The following is a simple example of an S matrix for pilot and paging cancellation.

$$S=[s1_0^0\ s1_1^0\ s1_0^1\ s2_0^0\ s2_1^0\ s2_0^1\ s2_1^1\ s3_0^0\ s3_1^0\ s3_0^2]$$

This example consists of the pilot and paging channels from a few base stations and a few multipaths. Note that it may be useful to only cancel the pilot channel for some of the weaker signals (or multipath) as in the example above since canceling the other weaker channels may provide not much additional gain.

It should be appreciated that the above-identified specific examples are provided to illustrate the concepts of constructing the interference matrix S, the inventive concept is not limited to the specific example.

Other Multi-Rank

The choice of channels to cancel depends on the requirements of the communication device/system, but would likely consist of the highest relative amplitude channels since they comprise the majority of the interference in detecting other base stations. After pilot and paging, more complete cancellation may be achieved with other multi-rank methods that include a greater number of channels. The greatest amount of additional cancellation with the smallest marginal computational cost is cancellation of pilot, paging and the strongest traffic channels. The previously discussed signal amplitude determination modules may provide an estimate of the strongest traffic channels to allow for a ranking of the strongest channels. A threshold may be chosen, such that all traffic channels above the threshold are included in the construction of interference matrix S or instead a pre-determined number of traffic channels may be included in the construction of interference matrix S.

The S matrix may be constructed of pilot, paging, traffic and other channels from an arbitrary number of base stations. The following is a simple example of an S matrix for multi-rank cancellation.

$$S=[s1_0^0\ s1_1^0\ s1_5^0\ s2_0^0\ s2_1^0\ s2_{45}^0\ s2_{56}^0\ s3_0^0\ s3_1^0\ s3_0^1\ s3_1^1\ s3_4^1]$$

This example consists of the pilot, paging and active traffic channels from a few base stations with multipath.

It should be appreciated that the above-identified specific examples are provided to illustrate the concepts of constructing the interference matrix S, the inventive concept is not limited to the specific example.

Full Rank

Full rank cancellation is computationally expensive, but provides virtually complete interference cancellation of all of one base station's channels without requiring knowledge of relative or absolute power. CdmaOne specifies 64 channels per base station including pilot, paging, synchronization and traffic, so the full rank cancellation procedure is of rank 64. In cdma2000 the number of channels greatly increases, including longer Walsh codes, supplementary Walsh codes and QOFs, so the rank may be much larger.

In cdmaOne the S matrix is constructed of all 64 channels. Without loss of generality, consider the cancellation of the LOS signal from base station one.

$$S=[s1_0^0\ s1_1^0\ s1_2^0\ s1_3^0 \ldots s1_{63}^0]$$

This S matrix may be augmented to include additional multipath signals or base stations. As previously noted, the number of interference vectors cannot exceed the rank of the matrix.

It should be appreciated that the above-identified specific examples are provided to illustrate the concepts of constructing the interference matrix S, the inventive concept is not limited to the specific example.

Use of Knowledge of Relative Signal Amplitude

If the mobile knows the relative power of some or all of the channels through the use of the relative signal amplitude modules, it may perform cancellation through the use of the composite method. The CSPE may linearly combine the columns (interference vectors) of the interference matrix S scaling with the relative signal amplitudes, into a single vector, referred to as a composite vector. Also, the relative signal amplitude information may be used to scale the vectors and to build a multi-rank interference matrix. Scaling each column of S with its known relative signal weight and adding them together accomplishes the linear combination as disclosed in the composite method. This produces a composite vector that points in the direction corresponding to the superposition of multiple interference vectors. Suppose the relative weights of all the channels are known, one may then combine the 64 columns of S in a cdmaOne system into a single vector or some other desired combination of composite vectors. Similarly, the interference vectors corresponding to multipath components may be similarly combined using the relative weights into a single vector or into a plurality of composite vectors.

Clearly, it is not necessary to include all the Walsh channels when constructing the interference subspace vector for a given base station's multipath signal. For example, some of the Walsh codes may not be in use or resolve so little power that they are not a significant contributor to the interference. A decision to include or exclude a particular channel may be made by examining the associated power resolved by that channel. If a channel is to be excluded from the interference space, then the power of that Walsh channel may be set to zero in the construction process or simply ignored. This operation will result in that channel being excluded from the construction of the composite interference vector. For example, one may decide to only include the pilot and paging channels, or just the pilot or a subset of channels, such as the strongest traffic channels, for construction of the interference matrix S.

The power assigned to each channel is set at the base-station by the power control and the relative power between the channels does not change from the transmission to when the signal is received at the mobile. While the power loss depends on the signal path as the multipath signals reflect off objects in its path, the relative power between channels remains constant. CSPE may use relative signal amplitude information because the projection operation is independent of the absolute power of the channels, reliant instead on direction within the multi-dimensional signal sub-space. The ability to use relative power is a feature of CSPE that is not provided for in competing techniques that rely on successive subtraction of interfering signals using absolute power estimation.

Clearly, if the QOF channels or supplementary channels are being used, then the power resolved on those channels must also be computed. A Fast Walsh Transform (FWT) may be useful for the latter. However, this time, the cross-correlations have to be accounted for, through the inverse of the Grammian matrix built from all the codes, i.e., $S^T S$. Recall that the QOFs are not orthogonal between QOF families or QOF families and the Walsh code set. Once the powers are estimated, they are used to build the interference space as described above.

Composite

The composite method is unique to the other methods previously discussed since there is not a direct correlation between the rank and the number of interfering channels that are effectively cancelled. It is very efficient computationally in terms of the amount of interference it may cancel, but it does require accurate estimation of the relative signal amplitude between the channels. The composite method may be used to cancel all of the channels in one base station, multiple base stations or only a subset of the total number of channels, typically the channels with the greatest amplitude. Each column of the S matrix may be composed of one or more base stations' channels. A simple example of a composite interference matrix for all channels (0–63) in a LOS signal is $$S=[s_p 1_{0-63}^0]$$

where the subscript denotes that the vector s is the summation of the 64 channels from one base station. Namely, $$s_{0-63}(t) = \sum_j R_j \cos(\omega t + m_i)$$

where all channels are summed with the relative amplitude R to form a composite vector. In addition, it is possible to form a composite S from more than one base station.

$$S=[s_p(1_{0-63}^0)(2_{0-33}^0)]$$

where s is composed of the LOS channels 0 through 63 of base station one and the LOS channels 0 through 33 of base station two. Moreover, multi-rank composite interference matrices may be formed.

$$S=[s_p 1_{0-63}^0\ s_p(2_{0-63}^0)(3_{0-33}^0) \ldots s_p 7_{0-37}^0]$$

where each column of the interference matrix may be itself a composite. The complexity of the composite is limited by the ability of the mobile unit to accurately determine the relative powers between the received channels.

It should be appreciated that the above-identified specific examples are provided to illustrate the concepts of constructing the interference matrix S, the inventive concept is not limited to the specific example.

Multipath Composite

The composite method may be extended to include multipath in much the same way as a plurality of multiple base stations may be integrated into a composite. For example, a composite interference matrix composed of a LOS signal and the first two multipath signals for channels 0–33 may be given as $$S=[s_p 1_{0-33}{}^{0-2}]$$

As in the previous composite example, more complicated composite interference matrices with multipath may be constructed.

$$S=[s_p 1_{0-33}{}^{0-1} \; s_p(2_{0-63}{}^{0,2})(3_{0-63}{}^{1}) \ldots s_p(7_{0-36}{}^{0})(8_{0-45}{}^{2})]$$

It should be appreciated that the above-identified specific examples are provided to illustrate the concepts of constructing the interference matrix S, the inventive concept is not limited to the specific example.

Permutations of other Methods

The generation of interference matrices may be extended to include combinations of the aforementioned methods. For example, a composite signal for one base station may be combined with the pilot and paging channels of a second base station's line of sight signal using knowledge of the bits transmitted and the strongest multipath of the third base station's pilot signal to form a rank 3 S matrix.

$$S=[s_p 1_{0-63}{}^{0} \; s_b 2_0{}^{0} \; s_b 2_1{}^{0} \; s3_0{}^{0}]$$

The complexity of the interference matrices generated is limited by the time and computational requirements set forth by the processing capabilities of the mobile unit.

It should be appreciated that the above-identified specific examples are provided to illustrate the concepts of constructing the interference matrix S, the inventive concept is not limited to the specific example.

A number of techniques have been studied for combining signals for improved performance. Some of the techniques include Maximal Ratio Combiner, Ratio-squared Combiner, Post-detection Combiner, Pre-detection Combiner, Selective Combiner and the Rake Receiver. The key idea behind these techniques is to combine the signals from a plurality of channels after scaling the signal in each channel by a quantity that is proportional to the power of that signal, i.e., ensuring that stronger signals are weighted more heavily in the sum, and inversely proportional to the power of the noise in that channel.

The method of the present invention involves canceling all those signals that might create interference (pilot, service channels, data channels and all their multipath signals) prior to performing the combining. The architecture discussed in this application accomplishes this via interference cancellation.

cdma2000

Additional modifications have to be made to accommodate features and enhancements made to CDMA2000. Quasi-orthogonal (QOF) and concatenated functions may be used after exhausting the Walsh family of orthogonal codes available for traffic channels. Variable length supplementary Walsh codes are also used to attain higher data rates. Specifically, shorter Walsh codes down to 4 chips in length are used to increase the data rate. The limitation on Walsh codes is a length limit of 128 for 1× rates and 256 for 3× rates, except for the auxiliary pilot and auxiliary transmit diversity pilot channels.

Due to the varying lengths of the Walsh codes, it will become increasingly important to have bit or relative amplitude information to facilitate interference cancellation. If the interference matrix contains non-pilot interference vectors composed of different length Walsh codes, it becomes imperative that the vectors of shorter length Walsh codes use either bit or relative amplitude information in order to correctly cancel interference. For information bearing channels it is necessary for no Walsh symbol boundaries to appear in the interference matrix if bit or relative amplitude information is not used. The benefit of canceling over one Walsh symbol is that it is not necessary to know bit or relative amplitude information. However, it may not be feasible to cancel interference over only 4 chip symbols since a longer data record may provide better cancellation properties.

Correlation will have to be accounted for when a mix of QOFs and variable length Walsh codes are used for channelization. While the goal is to minimize the correlation between QOFs and variable length Walsh codes, the codes are truly not orthogonal and there is a nonzero correlation. Even with perfect time alignment QOFs are not orthogonal to the original Walsh code set. Within a QOF set, orthogonality is preserved, but there is a correlation between code vectors from different sets. A critical difference is that when QOFs are used, channels within the same finger may no longer be orthogonal to each other. Therefore, the present invention may be applied to cancellation of channels within a single finger.

For example, to acquire, track and demodulate an arbitrary channel, for example, channel 25, in a finger that uses Walsh codes and QOFs it may be necessary to cancel all channels with a non-zero correlation. Without loss of generality, consider the channels with nonzero correlation relative to channel 25 to be channels 1–10 and 32. The following interference matrix S may be constructed for a LOS finger:

$$S=[s1_1{}^{0} \; s1_2{}^{0} \ldots s1_{10}{}^{0} \; s1_{32}{}^{0}]$$

Depending on variable length Walsh codes and the interference vector length it may be necessary to use bit or relative amplitude information when constructing the interference matrix.

It should be appreciated that the above-identified specific examples are provided to illustrate the concepts of constructing the interference matrix S, the inventive concept is not limited to the specific example.

Relative Power through the Standards Committee

An alternative method for relaying the relative powers (which are very accurately known at the base-station), which is not in the current standards, is to have the base-station broadcast the relative powers through the broadcast channel or some other channel. The mobile may receive this information from the appropriate channel and build the most accurate interference subspace vector possible. The mobile may build the matrix S with these vectors and then proceed to cancel the interference.

Interference Invariant Diversity Combining

A number of techniques have been studied for combining signals for improved performance. Some of the techniques include Maximal Ratio Combiner, Ratio-squared Combiner, Post-detection Combiner, Pre-detection Combiner, Selective Combiner and the Rake Receiver. The key idea behind these techniques is to combine the signals from multiple channels after scaling the signal in each channel by a quantity that is proportional to the amplitude of that signal, i.e., ensuring that stronger signals are weighted more heavily in the sum, and inversely proportional to the amplitude of the noise in that channel.

The approach of the present invention involves canceling all those signals that might create interference (pilot, paging, synchronization, traffic channels, data channels, all other channels and their multipath copies) prior to performing the raking. The architecture discussed here accomplishes this interference cancellation.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A method for generating an interference matrix S, the method comprising the steps of:
   A. Selecting at least one transmitter to be canceled and assigning said at least one transmitter to a variable t;
   B. Selecting at least one channel to be cancelled and assigning said at least one channels to a variable n, where n is less than or equal to a number of active channels N;
   C. Determining if a multipath signal should be canceled and assigning each of at least one multipath of interest to a variable M;
   D. Generating a sequence of column vectors V;
   E. Repeating steps C and D for each of the column vectors V;
   F. Defining said S matrix as $S=[V_1\ V_2\ \ldots\ V_c]$, wherein the index denotes a column index c,
   G. Determining a relative amplitude of an interference signal ($\theta$); and
   H. Multiplying an interference vector s by $\theta$ to produce a vector $s_p$; where $$V = s_p \sum_t^{\Sigma M}_{\Sigma n} = \sum_t \sum_n \sum_M s_p t_n^M,$$

$s_p t^0$ represents a line of sight (LOS) interference signal from said at least one channel to be cancelled of said at least one transmitter to be cancelled, and M>0 represents multipaths of interference signals of interest.

2. The method recited in claim 1, wherein said sequence of column vectors of the form $V=S_b t_{0-i}^{0-M}$ produced over the indices corresponding to channel number (0-i), multipath number (0-M) and transmitter number t, where $s_b t_i^0$ represents the line of sight (LOS) interference signal from said at least one channel to be cancelled of said at least one transmitter to be cancelled wherein transmitted bit values are known, and M>0 represents multipaths of interference signals of interest.

3. The method recited in claim 2, further comprising determining a sign of a transmitted symbol in data to determine whether said symbol is used in the construction of said interference matrix S or said symbol's inverse is used.

4. The method recited in claim 3, wherein said sign of the symbol is determined dynamically for each channel at the symbol rate.

5. The method recited in claim 3, wherein said step of determining the sign of a symbol in a channel comprises the following steps:
   Receiving a data signal y and producing a reference signal $x_0$ with an appropriate code offset, phase and/or frequency;
   Correlating said data signal y with a code used for channelization;
   Determining the sign of the symbol via the correlating step; and
   Utilizing said sign to determine whether the symbol used in the correlating is used in the construction of said interference matrix S or said symbol's inverse is used.

6. The method recited in claim 5, wherein said at least one code used for channelization is a pilot reference signal.

7. The method recited in claim 5, wherein said correlating is conducted by a Fast Hadamard Transform (FHT).

8. The method recited in claim 5, wherein said correlating is conducted by a Fast Walsh Transform (FWT).

9. The method recited in claim 5, wherein said step of determining the relative amplitude of a symbol in a channel comprises the following steps:
   Receiving a data signal y and producing a reference signal $x_0$ with the appropriate code offset, phase and/or frequency;
   Correlating said data signal y with at least one code used for channelization;
   Determining the relative amplitude, including sign, of the symbol via the correlating step;
   Scaling each symbol with said relative amplitude, including sign; and
   Utilizing said relative amplitude information, including sign, to determine whether the symbol used in the correlating step is used in the construction of said interference matrix S.

10. The method recited in claim 9, wherein said at least one code used for channelization is a pilot reference signal.

11. The method recited in claim 9, wherein said correlating step is conducted by a Fast Hadamard Transform (FHT).

12. The method recited in claim 9, wherein said correlating step is conducted by a Fast Walsh Transform (FWT).

13. The method recited in claim 9, further comprising determining if the power of a channel exceeds a predetermined threshold in order to determine whether to use said symbol in the construction of said interference matrix S.

14. The method recited in claim 13, wherein said predetermined threshold is based upon synchronization channel.

15. The method recited in claim 9, wherein a predetermined number of traffic channels are used in the construction of said interference matrix S.

16. The method recited in claim 3, further comprising determining if the power of a channel exceeds a predetermined threshold in order to determine whether to use said symbol in the construction of said interference matrix S.

17. The method recited in claim 3, wherein a predetermined number of traffic channels are used in the construction of said interference matrix S.

18. The method recited in claim 16, wherein said predetermined threshold is based upon the synchronization channel.

19. The method recited in claim 1, wherein said sequence of column vectors of the form $V=st_{0-n}^{0-M}$ produced over the indices corresponding to channel number (0-n), multipath number (0-M) and transmitter number t where $st^0$ represents the line of sight (LOS) interference signal from said channel to be cancelled of said transmitter to be cancelled and M>0 representing the multipaths interference signals of interest.

20. The method recited in claim 1, further comprising pre-selecting a value for n.

21. The method recited in claim 1, wherein n is dynamically selected based upon a system criterion.

22. The method recited in claim 21, wherein said system criterion is a threshold criterion.

23. The method recited in claim 21, wherein said system criterion is a subset based upon a ranking procedure.

24. The method recited in claim 1, wherein said selecting at least one transmitter is conducted by pre-selecting a value for t.

25. The method recited in claim 9, wherein t=1, which represents a single transmitter.

26. The method recited in claim 1, wherein said selecting at least one transmitter is conducted by dynamically selecting a value for t.

27. The method recited in claim 1, wherein the number of columns c in said interference matrix S is predetermined.

28. The method recited in claim 1, wherein the number of columns c in said interference matrix S is less than or equal to the number of active channels in all transmitters t, LOS and multipath signals M.

29. The method recited in claim 1, wherein M is dynamically selected based upon a system criterion.

30. The method recited in claim 29, wherein said system criterion is a threshold criterion.

31. The method recited in claim 29, wherein said system criterion is a subset based upon a ranking procedure.

32. The method recited in claim 1, wherein M is pre-selected.

33. An apparatus configured for generating an interference matrix S, said apparatus comprising: means for determining a number of active channels N in a transmitted signal; means for selecting at least one transmitter to be canceled and assigning each of said at least one transmitter to a variable t; means for selecting at least one channel to be cancelled and assigning each of said at least one channel to a variable n, where n is less than or equal to N; means for determining if a multipath signal should be canceled and assigning each of a plurality of multipaths of interest to a variable M; means for generating a sequence of column vectors V; wherein said interference matrix S is defined as $S=[V_1\ V_2\ \ldots\ V_c]$, and wherein the index denotes a column index c, means for determining a relative amplitude of an interference signal ($\theta$); and means for multiplying an interference vector s by $\theta$ to produce a vector $s_p$; where $$V = s_p \sum_{t}^{\Sigma M}_{\Sigma n} = \sum_{t}\sum_{n}\sum_{M} s_p t_n^M,$$

$s_p t^0$ represents a line of sight (LOS) interference signal from said channel to be cancelled of said transmitter to be cancelled, and M>0 represents multipaths of interference signals of interest.

34. A method for generating an interference matrix S, the method comprising the steps of:
  A. Determining a number of active channels N in a transmitter;
  B. Selecting at least one transmitter to be canceled and assigning each of said at least one transmitter to a variable t;
  C. Selecting at least one channel to be cancelled and assigning each of said at least one channel to a variable n, where n is less than or equal to N;
  D. Determining if a multipath signal should be canceled and assigning at least one multipath of interest to a variable M;
  E. Generating a sequence of column vectors of the form $V=st_{0-n}^{0-M}$, where $st^0$ represents a line of sight (LOS) interference signal from said at least one channel to be cancelled of said at least one transmitter to be cancelled, and M>0 represents multipaths of interference signals of interest;
  F. Repeating steps B, C, D and E for each column vector of interest over channels 0 to n, over multipaths 0 to M, and over the variable t; and
  G. Defining said interference matrix S as $S=[V_1\ V_2\ \ldots\ V_c]$, wherein subscript 1 to denotes a column index.

35. The method recited in claim 34, wherein said determining the number of active channels further comprises pre-selecting a value for n.

36. The method recited in claim 34, wherein n is dynamically selected based upon a system criterion.

37. The method recited in claim 36, wherein said system criterion is a threshold criterion.

38. The method recited in claim 37, wherein t=1, which represents a single transmitter.

39. The method recited in claim 36, wherein said system criterion is a subset based upon a ranking procedure.

40. The method recited in claim 34, wherein said selecting the at least one transmitter is conducted by pre-selecting a value for t.

41. The method recited in claim 34, wherein said selecting the at least one transmitter is conducted by dynamically selecting a value for t.

42. The method recited in claim 34, wherein the number of columns c in said interference matrix S is predetermined.

43. The method recited in claim 34, wherein the number of columns c in said interference matrix S is less than or equal to a total of the number of active channels in all transmitters t, LOS and multipath signals M.

44. The method recited in claim 34, wherein M is dynamically selected based upon a system criterion.

45. The method recited in claim 44, wherein said system criterion is a threshold criterion.

46. The method recited in claim 44, wherein said system criterion is a subset based upon a ranking procedure.

47. The method recited in claim 34, wherein M is pre-selected.

48. An apparatus for generating an interference matrix S, said apparatus comprising: means for determining a number of active channels N in a transmitted signal; means for selecting at least one transmitter to be canceled and assigning each of said at least one transmitter to a variable t; means for selecting at least one channel to be cancelled and assigning each of said at least one channel to a variable n, where n is less than or equal to N; means for determining if a multipath signal should be canceled and assigning each of at least one multipath of interest to variable M; and means for generating a sequence of column vectors of the form $V=st_{0-n}^{0-M}$ where $st^0$ represents a line of sight (LOS) interference signal from said at least one channel to be cancelled of said at least one transmitter to be cancelled, and M>0 representing multipaths of interference signals of interest; wherein said interference matrix S is defined as $S=[V_1\ V_2\ \ldots\ V_c]$ and wherein subscripts 1 to c denote a column index.

49. A method for generating an interference matrix S, the method comprising the steps of:
  A. Determining a number of active channels N in a transmitted signal;

B. Selecting at least one transmitter to be canceled and assigning each of said at least one transmitter to a variable t;

C. Selecting at least one channel to be cancelled and assigning each of said at least one channel to a variable n, where n is less than or equal to N;

D. Determining if a multipath signal should be canceled and assigning each of at least one multipath of interest to a variable M;

E. Generating a sequence of column vectors of the form $V = S_b t_{0-i}^{0-M}$, where $S_b t_i^0$ represents a line of sight (LOS) interference signal from said at least one channel to be cancelled of said at least one transmitter to be cancelled, where transmitted bit values are known and M>0 represents multipaths of interference signals of interest;

F. Repeating steps B, C, D and E for each column vector of interest over a channel subscript from 0 to i, over a multipath superscript from 0 to M, and over the variable t; and G. Defining said interference matrix S as $S=[V_1 V_2 \ldots V_c]$ wherein subscript 1 to c denotes a column index.

50. The method recited in claim 49, wherein said determining the number of active channels further comprises pre-selecting a value for n.

51. The method recited in claim 49, wherein n is dynamically selected based upon a system criterion.

52. The method recited in claim 51, wherein said system criterion is a threshold criterion.

53. The method recited in claim 52, wherein t=1, which represents a single transmitter.

54. The method recited in claim 51 wherein said system criterion is a subset based upon a ranking procedure.

55. The method recited in claim 49, wherein said selecting the at least one transmitter further comprises pre-selecting a value for t.

56. The method recited in claim 49, wherein said selecting the transmitter at least one is conducted by dynamically selecting a value for t.

57. The method recited in claim 49, wherein the number of columns c in said interference matrix S is predetermined.

58. The method recited in claim 49, wherein the number of columns c in said interference matrix S is less than or equal to a total of the number of active channels in all transmitters t, LOS and multipath signals M.

59. The method recited in claim 49, wherein M is dynamically selected based upon a system criterion.

60. The method recited in claim 59, wherein said system criterion is a threshold criterion.

61. The method recited in claim 59, wherein said system criterion is a subset based upon a ranking procedure.

62. The method recited in claim 49, wherein M is pre-selected.

63. The method recited in claim 49, further comprising determining a sign of a transmitted symbol in data to determine whether said symbol is used in the construction of said interference matrix S or said symbol's inverse is used.

64. The method recited in claim 63, wherein said sign is determined dynamically for each channel at the symbol rate.

65. The method recited in claim 63, wherein said step of determining the sign of a symbol in a channel comprises the following steps:

Receiving a data signal y and producing a reference signal $x_0$ with the appropriate code offset, phase and/or frequency;

Correlating said data signal y with the code used for channelization;

Determining the sign of the symbol from the correlating step; and

Utilizing said sign to determine whether symbols used in the correlating step are to be used for constructing said interference matrix S or said symbol's inverse is used.

66. The method recited in claim 65, wherein said at least one code used for channelization is a pilot reference signal.

67. The method recited in claim 65, wherein said correlating is conducted by a Fast Hadamard Transform (FHT).

68. The method recited in claim 65, wherein said correlating is conducted by a Fast Walsh Transform (FWT).

69. The method recited in claim 63, further comprising determining if the power of a channel exceeds a predetermined threshold in order to determine whether to use said symbol for constructing said interference matrix S.

70. The method recited in claim 69, wherein said predetermined threshold is based upon the synchronization channel.

71. The method recited in claim 63, wherein a predetermined number of traffic channels are used in the construction of said interference matrix S.

72. An apparatus for generating an interference matrix S, said apparatus comprising: means for determining a number of active channels N in a transmitter; means for selecting at least one transmitter to be canceled and assigning said each of said at least one transmitter to a variable t; means for selecting at least one channel to be cancelled and assigning each of said at least one channel to a variable n, where n is less than or equal to N; means for determining if a multipath signal should be canceled and assigning at least one multipaths of interest to a variable M; and means for generating a sequence of column vectors of the form $V = S_b t_{0-i}^{0-M}$ where $S_b t_i^0$ represents a line of sight (LOS) interference signal from said at least one channel to be cancelled of said at least one transmitter to be cancelled where transmitted bit values are known and M>0 represents multipaths of interference signals of interest; wherein said interference matrix S is defined as $S=[V_1 V_2 \ldots V_c]$, and wherein each of subscripts 1 to c denotes a column index.

73. A method for generating an interference matrix S, the method comprising the steps of:

A. Determining a number of active channels N in a transmitter;

B. Selecting at least one transmitter to be canceled and assigning each of said at least one transmitter to a variable t;

C. Selecting at least one channel to be cancelled and assigning said at least one channel to a variable n, where n is less than or equal to N;

D. Determining if a multipath signal should be canceled and assigning each of a plurality of multipaths of interest to a variable M;

E. Determining a relative amplitude of an interference signal (θ) corresponding to the at least one channel, the at least one transmitter, and one of the plurality of multipaths of interest;

F. Multiplying an interference vector s by θ to produce a vector $s_p$

G. Generating a column vector $$V = s_p \sum_t \sum_{\Sigma_n}^{\Sigma M} = \sum_t \sum_n \sum_M s_p t_n^M,$$

where $s_p t^o$ represents a line of sight (LOS) interference signal from said at least one channel to be cancelled of said at least one transmitter to be cancelled, and M>0 represents multipaths of interference signals of interest;

H. Repeating steps B, C, D, E, F and G for each column vector of interest over channel subscript n, over multipath superscript M, and index t; and I. Defining said interference matrix S as S=[V$_1$ V$_2$ ... V$_c$], wherein each of subscripts 1 to c denotes a column index.

74. The method recited in claim 73, wherein determining a number of active channels further comprises pre-selecting a value for n.

75. The method recited in claim 73, wherein n is dynamically selected based upon a system criterion.

76. The method recited in claim 75, wherein said system criterion is a threshold criterion.

77. The method recited in claim 75, wherein said system criterion is a subset based upon a ranking procedure.

78. The method recited in claim 73, wherein said selecting the at least one transmitter is conducted by pre-selecting a value for t.

79. The method recited in claim 78, wherein t=1, which represents a single transmitter.

80. The method recited in claim 73, wherein said selecting the at least one transmitter is conducted by dynamically selecting a value for t.

81. The method recited in claim 73, wherein the number of columns c in said interference matrix S is predetermined.

82. The method recited in claim 73, wherein the number of columns c in said interference matrix S is equal to 1.

83. The method recited in claim 73, wherein the number of columns in said interference matrix S is less than or equal to the total number of active channels in all transmitters t, LOS and multipath signals M.

84. The method recited in claim 73. wherein M is dynamically selected based upon a system criterion.

85. The method recited in claim 84, wherein said system criterion is a threshold criterion.

86. The method recited in claim 84, wherein said system criterion is a subset based upon a ranking procedure.

87. The method recited in claim 73, wherein M is pre-selected.

88. The method recited in claim 73, wherein said step of determining the relative amplitude of a symbol in a channel comprises:

Receiving a data signal y and producing a reference signal $x_0$ with the appropriate code offset, phase and/or frequency;

Correlating said data signal y with at least one code used for channelization;

Determining the relative amplitude, including sign, of the symbol from the correlating step;

Scaling each symbol with said relative amplitude, including sign; and

Utilizing said relative amplitude to determine whether the symbol used in the correlating is used for constructing said interference matrix S.

89. The method recited in claim 88, wherein said at least one code used for channelization is a pilot reference signal.

90. The method recited in claim 88, wherein said correlating is conducted by a Fast Hadamard Transform (FHT).

91. The method recited in claim 88, wherein said correlating is conducted by a Fast Walsh Transform (FWT).

92. The method recited in claim 88, further comprising the step of determining if power of a channel exceeds a predetermined threshold in order to determine whether to use said symbol in the construction of said interference matrix S.

93. The method recited in claim 92, wherein said predetermined threshold is based upon the synchronization channel.

94. The method recited in claim 88, wherein a predetermined number of traffic channels are used in the construction of said interference matrix S.

95. An apparatus for generating an interference matrix S, said apparatus comprising: means for determining a number of active channels N in a transmitted signal; means for selecting at least one transmitter to be canceled and assigning said at least one transmitter to a variable t; means for selecting channels to be cancelled and assigning said channels to a variable n, where n is less than or equal to N; means for determining if a multipath signal should be canceled and assigning at least one multipath of interest to a variable M; means for determining a relative amplitude of an interference signal (θ) corresponding to at least one channel, transmitter and multipath of interest; means for multiplying an interference vector s by θ to produce a vector $s_p$; and means for generating a column vector $$V = s_P \sum_t \sum_{\Sigma_n}^{\Sigma M} = \sum_i \sum_n \sum_M s_p t_n^M$$

where $s_p t^o$ represents a line of sight (LOS) interference signal from a channel to be cancelled of said at least one transmitter to be cancelled and M>0 representing multipaths of interference signals of interest; wherein said interference matrix S is defined as S=[V$_1$ V$_2$ ... V$_c$] and wherein each of subscripts 1 to c denotes a column index.

* * * * *